US012732235B2

(12) United States Patent
Jacobsson et al.

(10) Patent No.: US 12,732,235 B2
(45) Date of Patent: Sep. 8, 2026

(54) METHODS AND NODES FOR REPORTING OF UE ANTENNA GROUPS

(71) Applicant: TELEFONAKTIEBOLAGET LM ERICSSON (PUBL), Stockholm (SE)

(72) Inventors: Sven Jacobsson, Västra Frölunda (SE); Andreas Nilsson, Gothenburg (SE); Claes Tidestav, Bålsta (SE); Chandan Pradhan, Minami Ward City (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/859,272

(22) PCT Filed: Apr. 26, 2023

(86) PCT No.: PCT/IB2023/054308
§ 371 (c)(1),
(2) Date: Oct. 23, 2024

(87) PCT Pub. No.: WO2023/209599
PCT Pub. Date: Nov. 2, 2023

(65) Prior Publication Data

US 2025/0266866 A1 Aug. 21, 2025

Related U.S. Application Data

(60) Provisional application No. 63/336,333, filed on Apr. 29, 2022, provisional application No. 63/334,906, filed on Apr. 26, 2022.

(51) Int. Cl.
*H04B 7/0404* (2017.01)
*H04B 7/0456* (2017.01)
*H04L 5/00* (2006.01)

(52) U.S. Cl.
CPC ......... *H04B 7/0404* (2013.01); *H04B 7/0456* (2013.01); *H04L 5/0048* (2013.01)

(58) Field of Classification Search
CPC ......................... H04B 7/0691; H04B 7/06956; H04B 7/0404; H04B 7/0456; H04L 5/0048
See application file for complete search history.

(56) References Cited

U.S. PATENT DOCUMENTS

2011/0134902 A1* 6/2011 Ko ......................... H04B 7/068 370/344
2012/0288025 A1* 11/2012 Ogawa .................. H04L 1/0026 375/267

(Continued)

FOREIGN PATENT DOCUMENTS

EP 3562052 A1 10/2019

OTHER PUBLICATIONS

3GPP TS 38.211 V17.1.0, "3rd Generation Partnership Project; Technical Specification Group Radio Access Network; NR; Physical channels and modulation (Release 17)" Mar. 2022; 135 pages.

(Continued)

*Primary Examiner* — Sophia Vlahos
(74) *Attorney, Agent, or Firm* — Ericsson Inc.

(57) ABSTRACT

There is provided a method performed by a user equipment (UE) configured with a number of transmit antenna ports ($N_{TX}$). The method comprises: transmitting an indication of a number of transmit antenna port groups to a network node, wherein each transmit port group comprises one or more of the configured transmit antenna ports; and receiving an indication of a configuration for transmitting data to the network node, the configuration based on the number of transmit antenna port groups.

14 Claims, 8 Drawing Sheets

(56) References Cited

U.S. PATENT DOCUMENTS

| | | | | |
|---|---|---|---|---|
| 2019/0081668 | A1 | 3/2019 | Yang | |
| 2019/0181934 | A1* | 6/2019 | Kang | H04W 72/20 |
| 2019/0393931 | A1 | 12/2019 | Huang | |
| 2020/0382252 | A1* | 12/2020 | Sun | H04B 7/0626 |
| 2021/0219129 | A1* | 7/2021 | Liu | H04B 7/0465 |
| 2024/0113834 | A1* | 4/2024 | Elshafie | H04L 5/0051 |
| 2025/0112675 | A1* | 4/2025 | Wang | H04B 7/0639 |

OTHER PUBLICATIONS

3GPP TS 38.213 17.1.0 5G; NR; Physical layer procedures for control (3GPP TS 38.213 version 17.1.0 Release 17); May 2022; 247 pages. https://portal.3gpp.org/desktopmodules/Specifications/SpecificationDetails.aspx?specificationId=3215.

3GPP TS 38.331 V17.0.0, "3rd Generation Partnership Project; Technical Specification Group Radio Access Network; NR; Radio Resource Control (RRC) protocol specification (Release 17)", Mar. 2022; 1221 pages https://portal.3gpp.org/desktopmodules/Specifications/SpecificationDetails.aspx?specificationId=3197.

3GPP, "3rd Generation Partnership Project; Technical Specification Group Radio Access Network; NR; Multiplexing and channel coding (Release 17)", Mar. 2022, 3GPP TS 38.212 V17.1.0; 197 pages.

3GPP, "3rd Generation Partnership Project; Technical Specification Group Radio Access Network; NR; Physical layer procedures for data (Release 17)", Mar. 2022, 225 pages, TS 38.214 17.1.0. https://portal.3gpp.org/desktopmodules/Specifications/SpecificationDetails.aspx?specificationId=3216.

International Search Report for PCT/IB2023/054308, mailing date of Jun. 30, 2023; 15 pages.

* cited by examiner

transmitting an indication of a number of transmit antenna port groups to a network node, wherein each transmit port group comprises one or more of the configured transmit antenna ports
110 receiving an indication of a configuration for transmitting data to the network node, the configuration based on the number of transmit antenna port groups
120

FIG. 5

receiving an indication of a number of transmit antenna port groups from a User equipment (UE) configured with a number of transmit antennas ($N_{TX}$)
210 determining a configuration for the UE to transmit data, the configuration determined based on the indication of the number of transmit antenna port groups
220 transmitting an indication of the determined configuration to the UE
230

FIG. 6

Non-coherent
A1 A2 A3 A4 AG1
A5 A6 A7 A8 AG2

Coherent
A1 A2 A3 A4 AG1
A5 A6 A7 A8 AG2

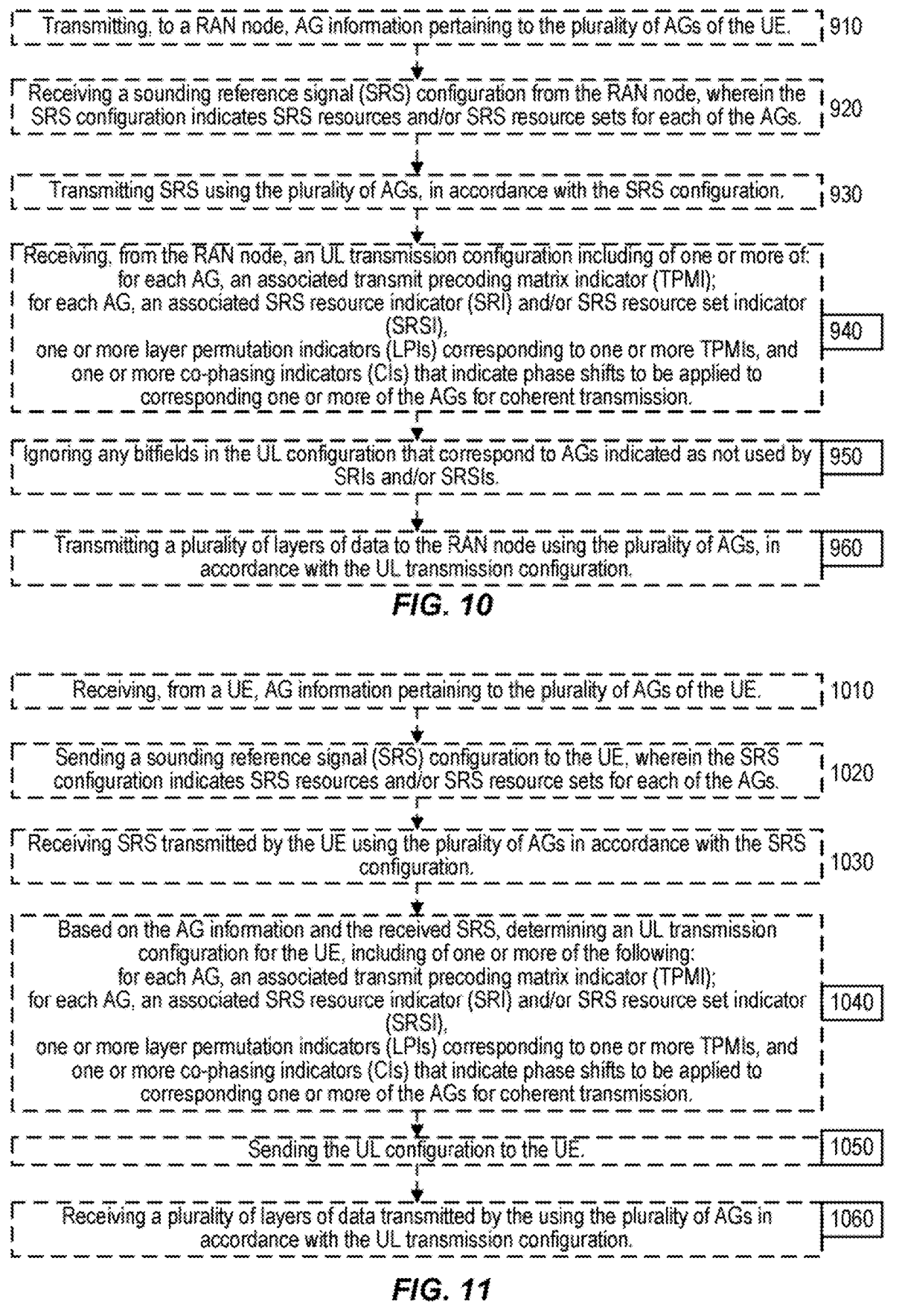

Transmitting, to a RAN node, AG information pertaining to the plurality of AGs of the UE. 910

Receiving a sounding reference signal (SRS) configuration from the RAN node, wherein the SRS configuration indicates SRS resources and/or SRS resource sets for each of the AGs. 920

Transmitting SRS using the plurality of AGs, in accordance with the SRS configuration. 930

Receiving, from the RAN node, an UL transmission configuration including of one or more of:
for each AG, an associated transmit precoding matrix indicator (TPMI);
for each AG, an associated SRS resource indicator (SRI) and/or SRS resource set indicator (SRSI),
one or more layer permutation indicators (LPIs) corresponding to one or more TPMIs, and
one or more co-phasing indicators (CIs) that indicate phase shifts to be applied to corresponding one or more of the AGs for coherent transmission. 940

Ignoring any bitfields in the UL configuration that correspond to AGs indicated as not used by SRIs and/or SRSIs. 950

Transmitting a plurality of layers of data to the RAN node using the plurality of AGs, in accordance with the UL transmission configuration. 960

*FIG. 10*

Receiving, from a UE, AG information pertaining to the plurality of AGs of the UE. 1010

Sending a sounding reference signal (SRS) configuration to the UE, wherein the SRS configuration indicates SRS resources and/or SRS resource sets for each of the AGs. 1020

Receiving SRS transmitted by the UE using the plurality of AGs in accordance with the SRS configuration. 1030

Based on the AG information and the received SRS, determining an UL transmission configuration for the UE, including of one or more of the following:
for each AG, an associated transmit precoding matrix indicator (TPMI);
for each AG, an associated SRS resource indicator (SRI) and/or SRS resource set indicator (SRSI),
one or more layer permutation indicators (LPIs) corresponding to one or more TPMIs, and
one or more co-phasing indicators (CIs) that indicate phase shifts to be applied to corresponding one or more of the AGs for coherent transmission. 1040

Sending the UL configuration to the UE. 1050

Receiving a plurality of layers of data transmitted by the using the plurality of AGs in accordance with the UL transmission configuration. 1060

*FIG. 11*

METHODS AND NODES FOR REPORTING OF UE ANTENNA GROUPS

RELATED APPLICATIONS

This application claims the benefits of priority of U.S. Provisional Patent Application No. 63/334,906, entitled "Explicit and implicit reporting of UE antenna groups" and filed at the United States Patent and Trademark Office (USPTO) on Apr. 26, 2022, and of U.S. provisional application No. 63/336,333, entitled "Co-phasing of User Equipment (UE) antenna groups" and filed at the USPTO on Apr. 29, 2022: the content of both is incorporated herein by reference.

TECHNICAL FIELD

The present disclosure relates generally to wireless networks, and more specifically to techniques for data transmissions from UEs that have relatively a large number of antennas (e.g., eight).

BACKGROUND

UL Transmission/Precoding Schemes

The channel that carries data in the NR UL is called Physical Uplink Shared Channel (PUSCH). In NR, there are two possible waveforms that can be used for PUSCH: Cyclic Prefix (CP)-Orthogonal Frequency Division Multiplex (OFDM) and Discrete Fourier Transform (DFT)-S-OFDM. Also, there are two transmission schemes specified for PUSCH: Codebook (CB)-based precoding and Non-Codebook (NCB)-based precoding.

The next generation or NR NodeB (gNB) configures, in Radio Resource Control (RRC), the transmission scheme through the higher-layer parameter txConfig in the PUSCH-Config Information Element (IE). CB-based transmission can be used for non-calibrated User Equipments (UEs) and/or for Frequency Division Duplexing (FDD), i.e., UL/DL reciprocity does not need to hold. NCB-based transmission, on the other hand, relies on UL/DL reciprocity and is, hence, intended for Time Division Duplexing (TDD).

CB-Based Precoding

CB-based PUSCH is enabled if the higher-layer parameter txConfig is set to 'codebook'. For dynamically scheduled PUSCH with configured grant type 2, CB-based PUSCH transmission can be summarized in the following steps:

1. The UE transmits a Sounding Reference Signal (SRS), configured in an SRS resource set with higher-layer parameter usage in SRS-Config IE set to 'codebook'. Up to two SRS resources (for testing up to two virtualizations/beams/panels) each with up to four ports, can be configured in the SRS resource set.

2. The gNB determines the number of layers (or rank) and a preferred precoder, i.e., Transmit Precoding Matrix Index (TPMI), from a codebook subset based on the received SRS from one of the SRS resources. The codebook subset is configured via the higher-layer parameter codebookSubset, based on reported UE capability, and is one of:

a. fully coherent ('fullyAndPartialAndNonCoherent'), or b. partially coherent ('partialAndNonCoherent'), or c. non-coherent ('nonCoherent'), 3. If two SRS resources are configured in the SRS resource set, the gNB indicates the selected SRS resource via a 1-bit SRS Resource Indicator (SRI) field in the Downlink Control Information (DCI) scheduling the PUSCH transmission. If only one SRS resource is configured in the SRS resource set, the SRI field is not indicated in the DCI.

4. The gNB indicates, via DCI, the number of layers and the TPMI. Demodulation (DM)-RS port(s) associated with the layer(s) are also indicated in the DCI.

5. The UE performs PUSCH transmission over the antenna ports corresponding to the SRS ports in the indicated SRS resource.

3GPP TS 38.212 provides different tables regarding the precoding information and number of layers for different antenna ports, e.g. Table 7.3.1.1.2-2, Table 7.3.1.1.2-3, Table 7.3.1.1.2-4 and Table 7.3.1.1.2-5.

For a given number of layers, the TPMI field indicates a precoding matrix that the UE should use for PUSCH. In a first example, if the number of antenna ports is 4, the number of layers is 1, and if transform precoding is disabled, then the set of possible precoding matrices is shown in Table 6.3.1.5-3 of 3GPP TS 38.211. In a second example, if the number of antenna ports is 4, the number of layers is 4, and if transform precoding is disabled, then the set of possible precoding matrices is shown in Table 6.3.1.5-7.

NCB-Based Precoding

NCB-based UL transmission is for reciprocity-based UL transmission in which SRS precoding is derived at a UE based on Channel State Information (CSI)-RS received in the DL. Specifically, the UE measures received CSI-RS and deduces suitable precoder weights for SRS transmission(s), resulting in one or more (virtual) SRS ports, each corresponding to a spatial layer.

A UE can be configured with up to four SRS resources, each with a single (virtual) SRS port, in an SRS resource set with higher-layer parameter usage in SRS-Config IE set to 'nonCodebook'. A UE transmits the up to four SRS resources and the gNB measures the UL channel based on the received SRS and determines the preferred SRS resource(s). Next, the gNB indicates the selected SRS resources via the SRI field in the DCI and the UE uses this information to precode PUSCH with a transmission rank that equals the number of indicated SRS resources (and, hence, the number of SRS ports).

SRS

In NR, the SRS is used for providing CSI to the gNB in the UL. The usage of SRS includes, e.g., deriving the appropriate transmission/reception beams and/or to perform link adaptation (i.e., setting the transmission rank and the Modulation Coding Scheme (MCS)), and for selecting DL (e.g., for Physical Downlink Shared Channel (PDSCH) transmissions) and UL (e.g., for PUSCH transmissions) Multi-Input Multi-Output (MIMO) precoding.

In Long Term Evolution (LTE) and NR, the SRS is configured via RRC, where parts of the configuration can be updated (for reduced latency) through Medium Access Control (MAC)-Control Element (CE) signaling. The configuration includes, for example, the SRS resource allocation (the physical mapping and the sequence to use) as well as the time-domain behavior (aperiodic, semi-persistent, or periodic). For aperiodic SRS transmission, the RRC configuration does not activate an SRS transmission from the UE but instead a dynamic activation trigger is transmitted from the gNB in the DL, via the DCI in the Physical Downlink Control Channel (PDCCH) which instructs the UE to transmit the SRS once, at a predetermined time.

When configuring SRS transmissions, the gNB configures, through the SRS-Config 1E, a set of SRS resources and a set of SRS resource sets, where each SRS resource set contains one or more SRS resources. A SRS resource is configured in RRC (see 3GPP TS 38.331 version 16.1.0).

An SRS resource is configurable with respect to, e.g.:

1. The number of SRS ports (1, 2, or 4), configured by the RRC parameter nrofSRS-Ports.

2. The transmission comb (i.e., mapping to every 2nd or 4th subcarrier), configured by the RRC parameter transmissionComb, which includes:

a. The comb offset, configured by the RRC parameter combOffset, is specified (i.e., which of the combs that should be used).

b. The cyclic shift, configured by the RRC parameter cyclicShift, that configures a (port-specific, for multi-port SRS resources) cyclic shift for the Zadoff-Chu sequence that is used for SRS. The use of cyclic shifts increases the number of SRS resources that can be mapped to a comb (as SRS sequences are designed to be (almost) orthogonal under cyclic shifts), but there is a limit on how many cyclic shifts that can be used (8 for comb 2 and 12 for comb 4).

3. The time-domain position within a given slot, configured with the RRC parameter resourceMapping, which includes:

a. The time-domain start position, which is limited to be one of the last 6 symbols (in NR Rel-15) or in any of the 14 symbols in a slot (in NR Rel-16), configured by the RRC parameter startPosition.

b. The number of symbols for the SRS resource (that can be set to 1, 2 or 4), configured by the RRC parameter nrofSymbols.

c. The repetition factor (that can be set to 1, 2 or 4), configured by the RRC parameter repetitionFactor. When the repetition factor is larger than 1, the same frequency resources are used multiple times across symbols, used to improve the coverage as this allows more energy to be collected by the receiver.

4. The sounding bandwidth, frequency-domain position and shift, and frequency-hopping pattern of an SRS resource (i.e., which part of the transmission bandwidth that is occupied by the SRS resource) is set through the RRC parameters freqDomainPosition, freqDomainShift, and the freqHopping parameters c-SRS, b-SRS, and b-hop. The smallest possible sounding bandwidth is 4 RBs.

5. The RRC parameter resourceType determines whether the SRS resource is transmitted as periodic, aperiodic (singe transmission triggered by DCI), or semi persistent (same as periodic except for the start and stop of the periodic transmission is controlled through MAC-CE signaling instead of RRC signaling).

6. The RRC parameter sequenceId specifies how the SRS sequence is initialized.

7. The RRC parameter spatialRelationInfo configures the spatial relation for the SRS beam with respect to another RS (which could be another SRS, a Synchronization Signal Block (SSB) or a CSI-RS). If an SRS resource has a spatial relation to another SRS resource, then this SRS resource should be transmitted with the same beam (i.e., virtualization) as the indicated SRS resource.

An SRS resource set is configured in RRC (see 3GPP TS 38.331 version 16.1.0).

SRS resource(s) will be transmitted as part of an SRS resource set, where all SRS resources in the same SRS resource set must share the same resource type. An SRS resource set is configurable with respect to, e.g.:

1. For aperiodic SRS, the slot offset is configured by the RRC parameter slotOffset and sets the delay from the PDCCH trigger reception to the start of the SRS transmission.

2. The resource usage, which is configured by the RRC parameter usage sets constraints and assumptions on the resource properties (see 3GPP TS 38.214 for further details). The SRS resource sets can be configured with one of four different usages: 'antennaSwitching', 'codebook', 'nonCodebook' and 'beamManagement'.

3. An SRS resource set that is configured with usage 'antennaSwitching' is used for reciprocity-based DL precoding (i.e., used to sound the channel in the UL so that the gNB can use reciprocity to set a suitable DL precoders). The UE is expected to transmit one SRS port per UE antenna port.

a. An SRS resource set that is configured with usage 'codebook' is used for CB-based UL transmission (i.e., used to sound the different UE antennas and help the gNB to determine/signal a suitable UL precoder, transmission rank, and MCS for PUSCH transmissions). There are up to two SRS resources in an SRS resource set with usage 'codebook'. How SRS ports are mapped to UE antenna ports is, however, up to UE implementation and not known to the gNB.

b. An SRS resource set that is configured with usage 'nonCodebook' is used for NCB-based UL transmission. Specifically, the UE transmits one SRS resource per candidate beam (suitable candidate beams are determined by the UE based on CSI-RS measurements in the DL and, hence, reciprocity needs to hold). The gNB can then, by indicating a subset of these SRS resources, determine which UL beam(s) that the UE should apply for PUSCH transmission. One UL layer will be transmitted per indicated SRS resource. Note that how the UE maps SRS ports to antenna ports is up to UE implementation and not known to the gNB.

4. The associated CSI-RS (this configuration is only applicable for NCB-based UL transmission) for each of the possible resource types.

a. For an aperiodic SRS, the associated CSI-RS resource is set by the RRC parameter csi-RS.

b. For semi-persistent/periodic SRS, the associated CSI-RS resource is set by the RRC parameter associatedCSI-RS.

To summarize, the SRS resource-set configuration determines, e.g., usage, power control, and slot offset for aperiodic SRS. The SRS resource configuration determines the time-and-frequency allocation, the periodicity and offset, the sequence, and the spatial-relation information.

SUMMARY

There currently exist certain challenge(s).

Legacy NR supports three different UE coherence capabilities: fully coherent, partially coherent, and non-coherent. A fully coherent 4 transmit (Tx) UE can maintain coherency over all 4 transmit ports, a partially coherent UE can maintain coherency within each pair of transmit ports, where the pair of ports are typically assumed to map to two different polarizations of a same antenna element, and a non-coherent UE cannot maintain coherency between transmit ports.

Note that there are many possible antenna architectures for UEs that are equipped with 8 (or more) Tx chains and existing (i.e., in legacy NR) UE capability signaling is not sufficient to describe all such 8 (or more) Tx UE antenna architectures, as explained below.

FIG. 1, for a 4 Tx UE, illustrates how a single transmission layer can be connected to the 4 antenna ports depending on UE coherency capability. For the purposes of this disclosure, an antenna port can be seen as equivalent to an antenna element or a transceiver chain. Fully connected precoding matrices are supported for fully coherent UEs, whereas only antenna-pair selection (with co-phasing within antenna pairs) and antenna selection are supported for partially coherent UEs and non-coherent UEs, respectively. For example, FIG. 1 illustrates a non-coherent UE 10, which 4 antenna ports that have no connections to each other, a partial coherent UE 20 with 2 antenna ports connected to each other and a fully coherent UE 30, whose 4 antenna ports are fully connected to each other.

Existing UE coherency capabilities are not sufficient to cover all possible UE architectures for 8 Tx UEs. For example, 8 Tx UEs may be able to maintain coherency over a set of 1, 2, 4, or 8 Tx chains and it would be unclear if a partially coherent UE would be able to maintain coherency within each of two quadruples of transmit ports or within each of four pairs of transmit ports. To optimize performance for 8 Tx UEs, it is required to resolve this ambiguity such that, e.g., a suitable set of precoding matrices can be signaled to the UEs.

Certain aspects of the disclosure and their embodiments may provide solutions to these or other challenges.

A method for a UE to provide information about the UE antenna architecture and/or coherency or to signal the coherency properties of the antenna system with an arbitrary number of antenna elements is provided.

For example, the UE reports to the network (e.g., to a gNB) a number, e.g., $N_g$, or a set. e.g., $N_g=[N_{g,0}, N_{g,1}, \ldots, N_{g,G-1}]$, of antenna port groups, for which:

- antenna ports within each group can be assumed to be coherent, and
- antenna ports in different groups cannot be assumed to be coherent.

The number of groups can be explicitly or implicitly signaled.

Further, the UE can report supported power scaling methods for one or more antenna port groups.

For example, there is provided a method in a UE, configured with a number of transmit antenna ports ($N_{TX}$). The method may comprise: transmitting an indication of a number of transmit antenna port groups to a network node, wherein each transmit port group comprises one or more of the configured transmit antenna ports; and receiving an indication of a configuration for transmitting data to the network node, the configuration based on the number of transmit antenna port groups. A UE configured to perform this method is also provided. Further, a method is provided in a network node. The method may comprise: receiving an indication of a number of transmit antenna port groups from a UE configured with a number of transmit antenna ports ($N_{TX}$); and determining a configuration for the UE to transmit data, the configuration determined based on the indication of the number of transmit antenna port groups; and transmitting an indication of the determined configuration to the UE. There is also provided a network node configured to perform this method.

Certain embodiments may provide one or more of the following technical advantage(s).

By receiving reports from, e.g., an 8 Tx UE containing information about the number of antenna port groups, a gNB can make correct and non-ambiguous assumptions regarding UE's antenna architecture and coherency capability when configuring for the UL transmissions.

BRIEF DESCRIPTION OF THE DRAWINGS

Exemplary embodiments will be described in more detail with reference to the following figures, in which:

FIG. 5 illustrates an exemplary flow chart of a method in a UE, according to an embodiment.

FIG. 6 illustrates an example of a flow chart of a method in a network node, according to an embodiment.

FIG. 10 shows a flow chart of an exemplary method for a UE according to an embodiment.

FIG. 11 shows a flow chart of an exemplary method for a RAN node (e.g., base station, eNB, gNB, ng-eNB, etc.), according to various embodiments.

DETAILED DESCRIPTION

Some of the embodiments contemplated herein will now be described more fully with reference to the accompanying drawings. Embodiments are provided by way of example to convey the scope of the subject matter to those skilled in the art.

UE Antenna Port Grouping

In a first example, a UE is configured with/has $N_{TX}$ transmit antenna ports. An "antenna port" is a 3GPP-defined abstraction of one or more physical antenna elements used to transmit a signal and any beamforming applied to these elements for the transmission. For example, even if two signals are transmitted using the same physical antenna elements, they will correspond to different antenna ports if they are beamformed/virtualized differently (e.g., with different antenna weights), since the beamforming will cause the signals to experience different channels.

The $N_{TX}$ transmit ports at the UE can be split into $N_g$ non-overlapping groups (i.e., subsets of the antenna ports $\{0,1, \ldots, N_{TX}-1\}$) for which:

1) antenna ports within each group can be assumed to be coherent, and
2) antenna ports in different groups cannot be assumed to be coherent.

The UE may be configured to do the antenna group splitting, for example. For illustration purposes, we provide examples of UE antenna-array architectures for the case when $N_{TX}\in\{6,8\}$ UE (transmit-) antenna ports are split into $N_g$ groups. Note that this is for illustration purposes only: the methods are equally applicable for any number of antenna ports.

For simplicity, it is assumed that the antenna elements within an antenna port group are dual polarized for the case when there is more than one antenna port in the group. Furthermore, it is assumed that antenna elements within a group are organized in a uniform array (i.e., a Uniform Linear Array (ULA) or a Uniform Planar Array (UPA)).

Figure 1:
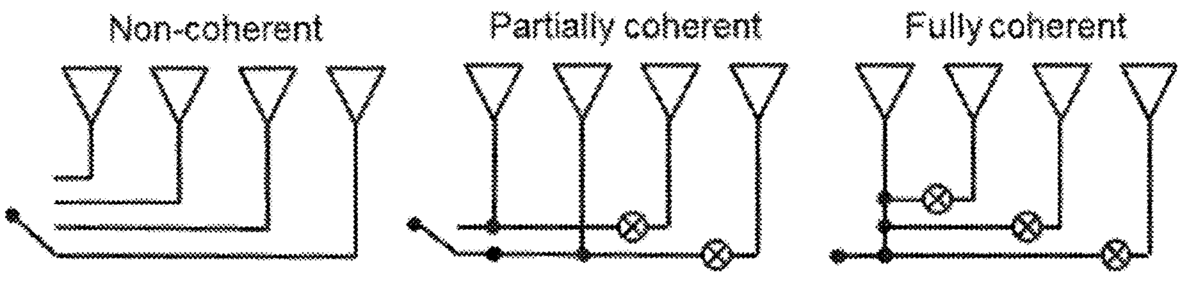
FIG. 1 illustrates examples of UE coherency capabilities for the 4 Tx UE (single-layer transmission).
Figure 2:
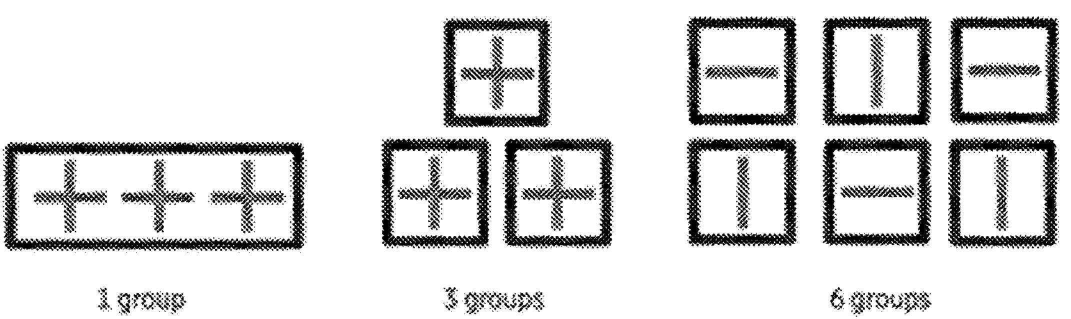
FIG. 2 illustrates examples of possible UE antenna architectures for a 6 Tx UE with 1, 3, or 6 groups.
Figure 3:
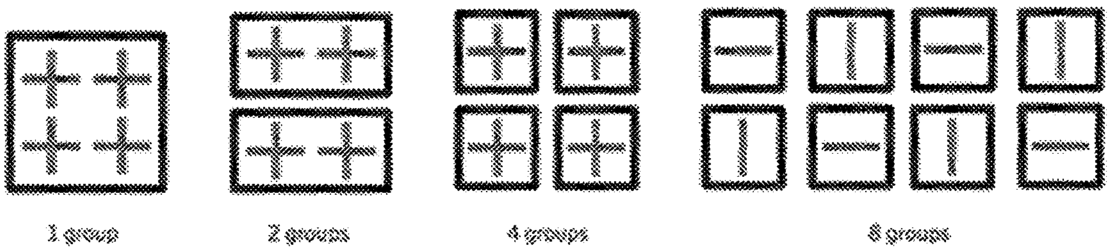
FIG. 3 illustrates examples of possible UE antenna architectures for an 8 Tx UE with 1, 2, 4, or 8 groups.

For example, it is assumed that all groups contain the same number of antenna ports. Under these assumptions, possible UE antenna architectures for a 6 Tx and an 8 Tx UE are shown in FIG. 2 and FIG. 3, respectively. In FIG. 2, $N_g \in \{1,3,6\}$ for a 6 Tx UE. In other words, FIG. 2 shows the possible UE antenna architectures for a 6 Tx UE with 1, 3, or 6 groups. A first polarization is shown as a horizontal bar, in this example and a second polarization is shown as a vertical bar.

FIG. 3 illustrates the possible UE antenna architectures for an 8 Tx UE with 1, 2, 4, or 8 groups, i.e. $N_g \in \{1,2,4,8\}$. Here again, a first polarization is shown as a horizontal bar, and a second polarization is shown as a vertical bar.

For each case (FIG. 2 or FIG. 3), there are $N_{TX}/N_g$ ports in each group. Note that the different antenna port groups may not be co-located and may be pointing in different directions.

Note that for 8 Tx (and with the assumptions above), there are two possible UE antenna-array architectures: A UPA (as in the left part of FIG. 3) and a ULA. FIG. 3 only illustrates the UPA case for 8 Tx UE.

Figure 4:
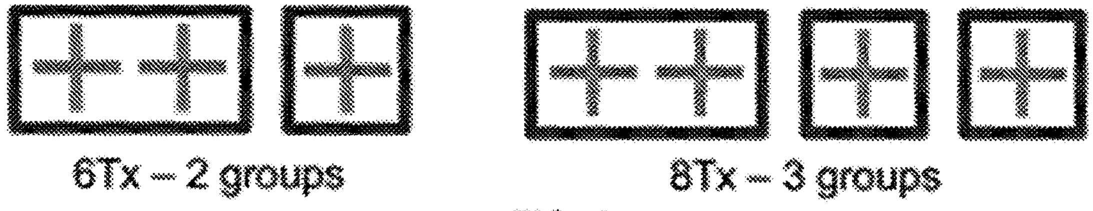
FIG. 4 illustrates examples of UE architectures with asymmetric groups.

In one example, not all the groups contain the same number of antenna ports. Two examples of such asymmetric UE architectures are provided in FIG. 4. Indeed, FIG. 4 illustrates UE architectures with asymmetric groups, in which a first polarization is shown as a horizontal bar and a second polarization is shown as a vertical bar.

In this case, all values $N_g \in \{1, 2, \ldots, N_{TX}\}$ could be allowed, irrespectively of the value of $N_{TX}$. However, there must be a common assumption between the network and the UE on which antenna ports belong to which group.

For example, for the case $N_{TX}=6$ and $N_g=2$ (see left part of FIG. 4), it may be assumed that the first four ports (e.g. the four SRS ports with the lowest SRS port number, e.g., {0,1,2,3}) belong to a first group (where the first group, for example, can be the antenna port group with the most number of antenna ports) and the last two ports (i.e. the two SRS ports with the highest SRS port number, e.g., {4,5}) belong to a second group (where the second group, for example, could be the antenna port group with the least number of antenna ports). As a note, a "SRS port" is a SRS signal transmitted on an antenna port.

Hence, the association of SRS ports with antenna port groups can be based on defining a certain order of the SRS ports and an order of the antenna port groups, and where there is an association between a first SRS port with a first antenna port of the first antenna group, a second SRS port with a second antenna port of the first antenna group, and so on until all the antenna ports in the first antenna group is associated with an SRS port, then the next SRS port is associated with the first antenna port of a second antenna group and so on until all the antenna ports in all antenna port groups have been associated with an SRS port. The ordering of the SRS ports can for example be based on the SRS port number (either in decreasing order or increasing order). The ordering of the antenna port groups can be either based on an explicitly indicated antenna group number signaled during UE capability signaling or be based on the number of antenna ports in each antenna group (either in decreasing or increasing order based on the number of ports in each antenna group).

Explicit Reporting of UE Antenna Port Groups

In some examples, the UE that is equipped with $N_{TX}$ transmit ports, signals/reports explicitly to the network (e.g., to the serving gNB) a single number of antenna port groups (or groups, in short) via UE capability signaling, for example.

For example, if a $N_{TX}$-port UE reports $$N_g^{reported}$$

groups, a gNB can assume that the number of groups at the UE is $$N_g = N_g^{reported}$$

and that is the only number of groups that is supported. If all groups must contain the same number of antenna elements, the gNB can assume that there is $N_{TX}/N_g$ ports within each group.

In another example, the UE that is equipped with $N_{TX}$ antenna elements signals/reports explicitly to the network (e.g., to the serving gNB) a plurality of numbers of antenna port groups via UE capability signaling, for example. Specifically, let $N_g \in [N_{g,0}, N_{g,1}, \ldots, N_{g,G-1}]$ denote the set of antenna port groups that is reported by the UE. If the cardinality of the set is larger than one, the gNB can assume that the UE supports more than one antenna-array architecture, which could affect, e.g., the set of valid TPMI candidates. For example, consider a UE with $N_{TX}=8$ that reports $N_g=[2,4]$ for which the gNB can assume that the UE supports both 2 and 4 groups.

Implicit Reporting of UE Antenna Port Groups

In one example, the number of UE antenna port groups can be inferred by the gNB from the reported number of transmit ports and the UE coherency capability. Indeed, the UE can transmit/report an extended set of UE coherency capabilities, where each coherency capability corresponds to a single or a plurality of number of antenna port groups.

If the UE reports that it is non-coherent (and hence only can be configured with the higher-layer parameter 'codebookSubset' set to 'nonCoherent'), the supported number of groups is $N_g=N_{TX}$, irrespectively of the value of $N_{TX}$.

If the UE reports that it is fully coherent (i.e., the UE can be configured with the higher-layer parameter 'codebookSubset' set to one out of 'nonCoherent', 'partialAndNonCoherent' or 'fullyAndPartialAndNonCoherent'), the supported number of groups (assuming equal-sized groups) is $N_g=[1,3,6]$ for $N_{TX}=6$ or $N_g=[1,2,4,8]$ for $N_{TX}=8$.

For example, for 8 Tx UEs that are equipped with a fully-coherent ULA or UPA (note that this could be a realistic assumption, e.g., for high-end Consumer Peripheral Equipment (CPE)/Fixed Wireless Access (FWA) devices) including more than one group (i.e., $N_g=1$) may cause additional overhead as the gNB is expected to signal a TPMI that corresponds to a fully-connected precoding matrix, to make use of an array gain provided by the UE antenna array.

Therefore, in one example, the possible values of the higher-layer parameter 'codebookSubset' may include new values, e.g., 'fullyCoherent', with an associated new UE coherency capability, which indicates that $N_g=1$.

In one example, if the UE reports that it is partially coherent (i.e., the UE can be configured with the higher-layer parameter 'codebookSubset' set to one out of 'nonCoherent' or 'partialAndNonCoherent') and $N_{TX}$=6, the supported number of groups (assuming equal-sized groups) is $N_g$=[3,6].

Furthermore, for $N_{TX}$=6, the possible values of the higher-layer 'codebookSubset' may include a new value (e.g., 'partialCoherent'), with an associated new UE coherency capability, which indicates that $N_g$=3.

If the UE reports that is partially coherent (i.e., the UE can be configured with the higher-layer parameter 'codebookSubset' set to one out of 'nonCoherent' or 'partialAndNonCoherent') and $N_{TX}$=8, there are possible ways to interpret how many groups that are supported by the UE:

- for example, for $N_{TX}$=8, if the higher-layer parameter 'codebookSubset' is set to 'partialAndNonCoherent' (after the UE has reported that it is partially coherent), the gNB assumes that the supported number of groups is $N_g$=[2,4,8].
- in another example, for $N_{TX}$=8, if the higher-layer parameter 'codebookSubset' is set to 'partialAndNonCoherent' (after the UE has reported that it is partially coherent), the gNB assumes that the supported number of groups is $N_g$=[2,8].
- in another example, for $N_{TX}$=8, if the higher-layer parameter 'codebookSubset' is set to 'partialAndNonCoherent' (after the UE has reported that it is partially coherent), the gNB assumes that the supported number of groups is $N_g$=[4,8].
- in another example, for $N_{TX}$=8, the higher-layer parameter 'codebookSubset' can be set to additional (with respect to legacy NR) values including, e.g.:
  - a. 'partial2Coherent': the gNB assumes that $N_g$=2.
  - b. 'partial4Coherent': the gNB assumes that $N_g$=4.
  - c. 'partial2CoherentAndNonCoherent: the gNB assumes that $N_g$=[2,8].
  - d. "partial4CoherentAndNonCoherent": the gNB assumes that $N_g$=[4,8].
- for each new entry in 'codebookSubset', there is a corresponding UE coherency capability that is signaled from the UE to the gNB via UE capability signaling.

In one example, a UE with $N_{TX}$ transmit ports, where $N_{TX}$ could be 6 or 8, implicitly signals via UE capability signaling the number of (transmit-) antenna port groups to the network by indicating the maximum number of SRS resources supported in an SRS resource set with usage 'codebook' (where the number of SRS resources is equal to the number of antenna-port groups). In other words, the UE transmits/reports the maximum number of SRS resources supported in an SRS resource set with usage 'codebook'.

In another example, the UE transmits/reports the maximum number of SRS resource sets supported with usage 'codebook' and/or 'nonCodebook', where the number of SRS resource sets is equal to the number of antenna port groups.

Explicit Reporting of UE Power Scaling Methods

Depending on the power amplifier architecture used for an antenna array, different power scaling methods can be applied, for example the Rel-15 power scaling method, and/or Rel-16 full power mode 0, 1 and 2. Depending on which power scaling mode is assumed for an antenna array, different sets of TPMIs might be enabled. Hence, in case the antenna port groups are introduced for 6Tx and 8Tx UEs, it might be beneficial to signal which full power mode a UE supports per antenna port group. Hence, in one example, the power scaling methods a UE supports are explicitly signaled per antenna port group. For example, in case all the antenna port groups have the same number of antenna elements and the same power amplifier architecture, the UE might indicate the supported power scaling methods only once, and the gNB can assume that it is applicable for all antenna port groups. The gNB can then configure the UE with a certain power scaling method per antenna port group (based on which power scaling methods each antenna port group supports). This is useful since different antenna port groups require more/different overhead signaling, but gives higher performance, and vice versa, and hence it could be useful for the gNB to control which power control mode should be assumed for a certain antenna port group to balance the performance vs. overhead signaling.

In other words, the UE explicitly signals transmission power capabilities associated with one or more antenna port groups. For example, a UE with $N_{TX}$ transmit antenna ports can explicitly signal via UE capability signaling the supported coherency capabilities and/or power scaling methods supported for one or more antenna port groups.

Explicit Reporting of Maximum UE Transmit Power

Depending on the power amplifier architecture used for an antenna array, the maximum transmit power of each antenna port group may be different. Depending on the maximum transmit power mode that is assumed for an antenna array, different sets of TPMIs might be enabled. Hence, in case the antenna port groups are introduced, it might be beneficial to signal the maximum transmit power a UE supports per antenna port group. The maximum transmit power may be provided either as maximum effective isotropic radiated power (EIRP) or Total radiated power (TRP). Hence, in one example, the maximum transmit power that a UE supports can be explicitly signaled per antenna port group.

Now, turning to FIG. 5, a flow chart of a method 100, in a UE (e.g. 1212A of FIG. 12) for indicating a number of antenna port groups by a UE to a network node will be described. The UE is configured with a number of transmit antennas ($N_{TX}$), e.g. 8. Method 100 comprises:

Step 110: transmitting an indication of a number of transmit antenna port groups to a network node, wherein each transmit port group comprises one or more of the configured transmit antenna ports; and Step 120: receiving an indication of a configuration for transmitting data to the network node, the configuration based on the number of transmit antenna port groups.

In some examples, the indication can be explicit, meaning that the number of antenna port groups is provided (it could be 1, 2, 3 or 4), for example.

In some examples, the indication is implicit, meaning that a coherency capability is provided and based on that coherency capability, the network node can determine the number of antenna port groups. A number of SRS resources or SRS resource sets can also indicate to the network node the number of antenna port groups.

In some examples, the indication of the configuration may comprise an indication of a precoder for the UE to use. In some examples, transmitting an indication of a number of transmit antenna port groups may comprise transmitting an indication of a single group of transmit antenna ports. In some examples, the indicated number of one single antenna port group indicates that the UE is fully coherent. In some examples, transmitting a number of transmit antenna port groups may comprise transmitting an indication of a plurality of groups of transmit antenna ports. In some examples, the number of transmit antenna port groups is 2 or 4, which indicates that the UE is partially coherent. In some examples, the number of transmit antenna port groups is 8, which indicates that the UE is non-coherent, when $N_{TX}$ is 8. In some examples, transmitting the indication of the number of transmit antenna port groups may comprise sending a UE capability signaling comprising the indication. In some examples, transmit antenna ports within each transmit antenna port group are assumed coherent, and transmit antenna ports in different transmit antenna port groups are assumed non-coherent. In some examples, the plurality of groups contains a same number of transmit antenna ports. In this case, if $N_g$ is the number of transmit antenna port groups, then the number of transmit antenna ports in each group is given by $N_{TX}/N_g$. In some examples, the plurality of transmit antenna port groups contains different numbers of transmit antenna ports. In some examples, the UE may associate a group of SRS ports to a transmit antenna port group, based on an ordering of the SRS port within an SRS resource set. In some examples, the ordering of the SRS ports is based on the SRS port number. In some examples, the ordering of the SRS ports is based on the SRS resource ID of the SRS resources in the SRS resource set. In some examples, transmitting an indication of a number of transmit antenna port groups may comprise transmitting an indication of coherency capability. For example, the indication of coherency capability comprises one of a non-coherent capability, full coherent capability, and partial coherent capability. In some examples, the number of transmit antenna ports ($N_{TX}$) may be 8. In some examples, transmitting an indication of a number of transmit antenna port groups may comprise transmitting an indication of a maximum number of SRS resources supported in a SRS resource set with 'usage' set to codebook. In some examples, transmitting an indication of a number of transmit antenna port groups may comprise transmitting a maximum number of SRS resource sets supported with 'usage' set to codebook and/or non-codebook. In some examples, the UE may send an indication of a power scaling method for one or more transmit antenna port groups to the network node. In some examples, the UE may send a maximum transmit power. In some examples, the UE may send information related to the number of transmit antenna port groups. For example, the information may comprise an indication of co-phasing capabilities between the transmit antenna port groups. In some examples, the UE may receive a layer permutation indication from the network node.

FIG. 6 illustrates a flow chart of a method 200, in a network node (e.g RAN node such as 1210A of FIG. 12) for determining configuration parameters/configurations for UL transmissions for a UE. The UE is configured with a number of transmit antennas ($N_{TX}$), e.g. 8. Method 200 comprises:

Step 210: receiving an indication of a number of transmit antenna port groups from a UE configured with a number of transmit antennas ($N_{TX}$);

Step 220: determining a configuration for the UE to transmit data, the configuration determined based on the indication of the number of transmit antenna port groups; and Step 230: transmitting an indication of the determined configuration to the UE.

In some examples, the indication can be explicit, meaning that the number of antenna port groups is provided (it could be 1, 2, 3 or 4), for example.

In some examples, the indication is implicit, meaning that a coherency capability is provided and based on that coherency capability, the network node can determine the number of antenna port groups. A number of SRS resources or SRS resource sets can also indicate to the network node the number of antenna port groups.

In some examples, the indication of the configuration may comprise an indication of a precoder for the UE to use. In some examples, receiving an indication of a number of transmit antenna port groups may comprise receiving an indication of a single group of transmit antenna ports. In this case, the single antenna port group indicates that the UE is fully coherent. In some examples, receiving a number of transmit antenna port groups may comprise receiving an indication of a plurality of groups of transmit antenna ports. In some examples, the number of transmit antenna port groups is 2 or 4, which indicates that the UE is partially coherent. In some examples, the number of transmit antenna port groups is 8, which indicates that the UE is non-coherent, when $N_{TX}$ is 8. In some examples, receiving the indication of the number of transmit antenna port groups may comprise receiving a UE capability signaling comprising the indication. In some examples, the transmit antenna ports within each transmit antenna port group are assumed coherent and the transmit antenna ports in different transmit antenna port groups are assumed non-coherent. In some examples, the plurality of groups contains a same number of transmit antenna ports. In this case, if $N_g$ is the number of transmit antenna port groups, then the number of transmit antenna ports in each group is given by $N_{TX}/N_g$. In some examples, the plurality of transmit antenna port groups contains different numbers of transmit antenna ports. In some examples, receiving an indication of a number of transmit antenna port groups may comprise receiving an indication of coherency capability. For example, the indication of coherency capability may comprise one of a non-coherent capability, full coherent capability and partial coherent capability. In some examples, the network node may receive an indication of a maximum number of SRS resources supported in a SRS resource set with 'usage' set to codebook. In some examples, the network node may receive a maximum number of SRS resource sets supported with 'usage' set to codebook and/or non-codebook. In some examples, the network node may receive an indication of a power scaling method for one or more transmit antenna port groups to the network node. In some examples, the network node may receive a maximum transmit power. In some examples, the network node may receive information related to the number of transmit antenna port groups. For example, the information may comprise an indication of co-phasing capabilities between the transmit antenna port groups. In some examples, the network node may transmit a layer permutation indication to the UE.

As mentioned above, for NR Rel-18, it is desirable to support up to 8 ports (and more) than 4 layers for CB-based UL transmission. Even so, different UEs that support 8 antenna ports for UL transmission may utilize different UE transmit antenna architectures. For example, an eight-Tx UE might be equipped with multiple antenna groups that point in different directions and/or have different coherency capabilities. Different UEs may have different numbers of antenna port groups, different numbers of antennas ports per group, etc. Depending on the specific UE transmit antenna architecture and the instantaneous UL channel between the UE and gNB, a wide range of UL codebooks and/or UL precoders will be needed to obtain desired UE UL performance. However, it is unclear how to design UL codebooks and/or indicate UL precoders for such a wide range of possible UE antenna architectures. For example, a Rel-17 work item objective is to study, and if justified, specify UL DMRS, SRS, SRS resource indicator (SRI), and TPMI (including codebook) enhancements to enable UE UL operation using 8 transmitters (Tx) to support four or more layers, particularly in applications targeting customer premises equipment (CPE), fixed wireless access (FWA), vehicle, and industrial. Potential restrictions on the scope of this objective (e.g., coherence assumption, full/non-full power modes, etc.) will be identified as part of the study.

Accordingly, this disclosure further provides flexible and efficient techniques for eight-Tx UEs with multiple antenna groups (AG), where each AG includes antenna elements that have a specific property, e.g., mutually coherent, co-located and pointing in the same direction, etc. Depending on the UE's antenna architecture (e.g., number of AGs, AG pointing in different directions, number of antenna elements per AG, etc.) and the experienced UL channel, it might be preferrable to transmit UL signals over a single antenna group or over multiple AGs, either with or without co-phasing of layers transmitted on respective AGs. For example, some embodiments provide techniques to indicate how to co-phase precoders over one or more of the AGs. These embodiments are application to UEs having more than 8 Tx antennas. It should be noted that an AG is equivalent to a transmit antenna port group, as described above. These terms may be used interchangeably.

The embodiments can further provide various benefits and/or advantages. For example, they can facilitate increased PUSCH output power and/or increased antenna gain by enabling co-phasing between different antenna groups, which can improve UL performance in a wireless network.

Embodiments include methods (e.g., procedures) for a UE configured for UL transmission to a RAN using a plurality of AGs, each AG comprising a plurality of antenna elements.

Figures 7, 8, 9:
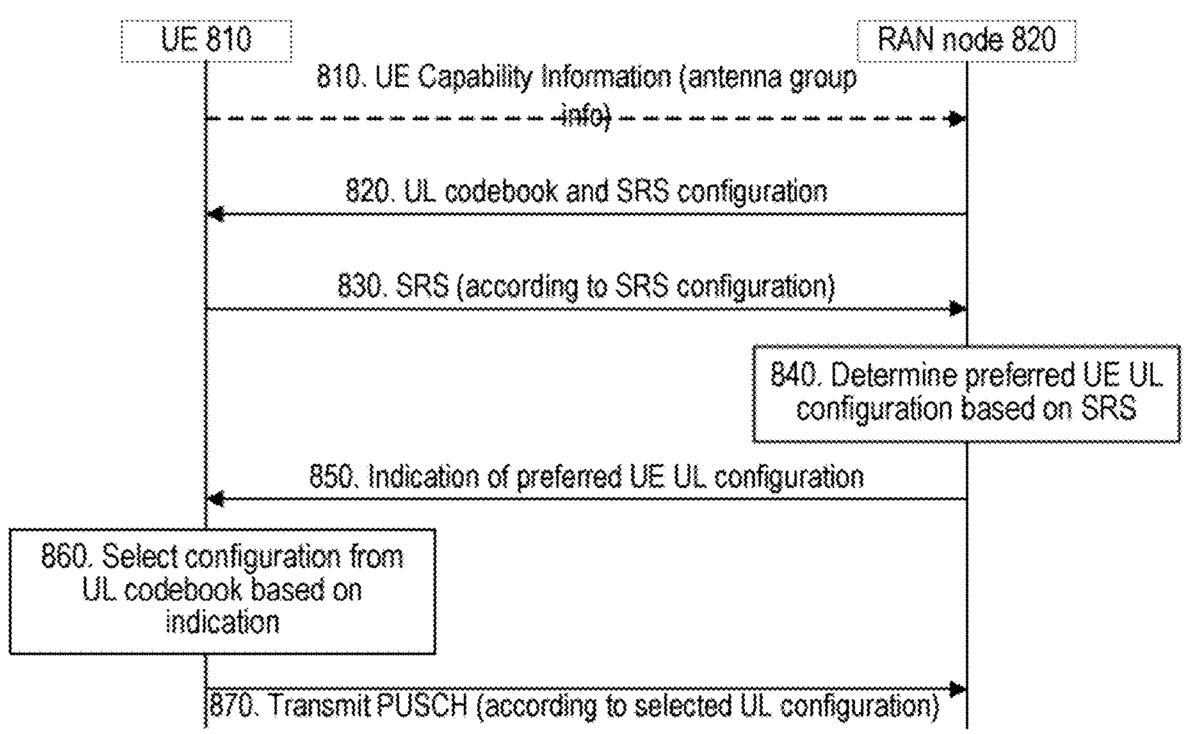
FIG. 7 shows signaling between a UE and a RAN node, according an embodiment.
FIGS. 8-9 show exemplary UE Tx architectures that include two antenna groups (AGs) with four antenna elements each, according to various embodiments of the present disclosure.

FIG. 7 shows a signaling diagram 300 between a UE (810) and a RAN node (820, e.g., gNB) that illustrates various embodiments. Although the operations shown in FIG. 7 are given in numerical labels, this is done to facilitate the following explanation rather than to require or imply any sequential order, unless stated to the contrary below.

In operation 810, which is optional, the UE sends to the RAN node UE capability information that includes an "antenna group information" field or IE. The antenna group information indicates co-phasing capabilities between different AGs of the UE, for example.

In operation 820, the RAN node configures the UE with an UL codebook and corresponding SRS configuration. This can be based, for example, on the antenna group information received in operation 810.

In operation 830, the UE performs an SRS transmission according to the SRS configuration received in operation 820. Although not shown, the RAN node may also send a DCI (or similar message) that triggers the SRS transmission. In operation 840, the RAN node determines a preferred UE UL configuration based on the SRS transmissions received in operation 830. The preferred UL configuration can include one or more parameters or indices such as SRI (also called SRSI), TPMI, co-phasing factors, and layer permutation indication.

In operation 850, the RAN node sends an indication of the preferred UL configuration to the UE. This indication can be the parameters or indices determined in operation 840, or some representation of these such as an index, a codeword, etc. In operation 860, the UE selects a configuration from the UL codebook received in operation 820 based on the indication received in operation 850. In operation 870, the UE transmits the PUSCH according to the selected configuration, which can be based on the one or more parameters or indices (e.g., SRI, TPMI, co-phasing factors, layer permutation indication, etc.) indicated by the RAN node in operation 850.

FIG. 8 shows an exemplary UE Tx architecture that includes two AGs with four antenna elements each, according to some embodiments. Specifically, AG1 includes antenna elements A1-A4 and AG2 includes antenna elements A5-A8. Odd-numbered antenna elements are shown as horizontally polarized and even-numbered antenna elements are shown as horizontally polarized, but this is merely for purposes of illustration.

In FIG. 8, AG1 and AG2 are assumed to be non-coherent. A layer can be transmitted from a single AG or from both AGs, but in the latter case, a cyclic delay diversity (CDD) can be applied to the layer on at least one of the AGs to reduce the risk of co-phasing that would reduce UL performance. The following description refers to the operations shown in FIG. 8 based on the architecture shown in FIG. 8.

In these embodiments, the "antenna group information" signaled in operation 810 includes one or more of number of AGs, number of antenna elements per AG, and co-phasing capability between AGs. In operation 820, the RAN node configures the UE with an SRS configuration for CB-based operation. For example, the UE is configured with a single SRS resource set with two 4-port SRS resources, one SRS resource per AG.

In operation 830, the UE transmits the two configured SRS resources, i.e., one 4-port SRS resource per AG. In operation 840, the RAN node receives the two SRS resources and determines a precoder and rank per AG, as well as whether co-phasing should be applied over the AGs. More specifically, the RAN node determines whether each layer should be transmitted from a single AG or from both AGs and, in the latter case, whether co-phasing is needed over the two AGs. For example, the RAN node determines that the same two PUSCH layers should be transmitted from both AGs, and that each PUSCH layer should be co-phased by applying CDD on both PUSCH layers transmitted from one of the AGs (e.g., AG2). In operation 850, the RAN node sends an indication of the determined SRIs/TPMIs and/or co-phasing indication to the UE, and the UE transmits PUSCH accordingly in operation 870.

FIG. 9 shows another exemplary UE Tx architecture that includes two AGs with four antenna elements each, according to other embodiments. Specifically, AG1 includes antenna elements A1-A4 and AG2 includes antenna elements A5-A8. Odd-numbered antenna elements are shown as horizontally polarized and even-numbered antenna elements are shown as horizontally polarized, but this is merely for purposes of illustration.

In FIG. 9, AG1 and AG2 are assumed to be coherent. A layer can be transmitted from a single AG or from both AGs, but in the latter case, a CDD can be applied to the layer on at least one of the AGs. Alternately or additionally, a coherent co-phasing factor can be used to coherently combine a layer transmitted from both AGs. The following description refers to the operations shown in FIG. 7 based on the architecture shown in FIG. 9.

In these embodiments, the "antenna group information" signaled in operation 810 includes number of AGs, number of antenna elements per AG, and co-phasing capability between AGs. In operation 820, the RAN node configures the UE with an SRS configuration for CB-based operation. For example, the UE is configured with a two SRS resource sets, each with a 4-port SRS resource. Each SRS resource (and set) is associated with a different AG.

In operation 830, the UE transmits the two configured SRS resources, i.e., one 4-port SRS resource per AG. In operation 840, the RAN node receives the two SRS resources and determines a precoder and rank per AG, as well as whether co-phasing should be applied over the AGs. More specifically, the RAN node determines whether each layer should be transmitted from a single AG or from both AGs and, in the latter case, whether co-phasing is needed over the two AGs. For example, the RAN node determines that the same two PUSCH layers should be transmitted from both AGs, and that each layer should be co-phased coherently across the two AGs. The RAN node also determines per-layer phase differences needed to co-phase each layer transmitted from the two AGs. In operation 380, the RAN node sends an indication of the determined SRIs/TPMIs and/or co-phasing indication to the UE, and the UE transmits PUSCH accordingly in operation 870.

When legacy Rel-15 UL codebooks for rank 2 with four antenna ports (specified in 3GPP TS 38.211 v17.1.0 Table 6.3.1.5-5) are re-used per AG, each TPMI is associated with a corresponding order of the layers. For example, if TPMI 14 ([1, 1, 1, 1:1, 1,−1,−1]) is indicated for both TPMIs/AGs, the first layer of each AG will have precoder [1,1,1, 1] and the second layer of each AG will have precoder [1,1,−1,−1]. However, it may be desirable to co-phase one layer with precoder [1,1,1,1] for a first TPMI/AG (e.g., AG1) with precoder [1,1,−1,−1] for a second TPMI/AG (e.g., AG2). However, since the layer order is inherent in the TPMI from Rel-15 NR UL codebooks, this combination will not be possible.

In some embodiments, to improve co-phasing flexibility, the RAN node provides to the UE a layer permutation indication (LPI) that indicates which layers transmitted from a first TPMI/AG should be co-phased with which layers transmitted from the second TPMI/AG. For example, with two AGs and two layers, an LPI with two codepoints (or values) is sufficient to indicate whether order of the layers corresponding to one of the TPMIs/AGs should be maintained (as conventional) or switched. As a more specific example with TPMI 14, LPI-0 indicates precoder [1,1,1,1: 1,1,−1,−1] for the first TPMI/AG (i.e., layer order maintained), and LPI=1 indicates precoder [1,1,−1,−1:1,1,1,1] for the first TPMI/AG (i.e., layer order switched). When the RAN node provides the LPI as part of the preferred UE UL configuration in operation 850, the UE transmits PUSCH accordingly in operation 870.

In some embodiments, co-phasing factors for $N_g$ AGs are signaled from the RAN node to the UE through DCI. For example, a new DCI field (e.g., co-phasing indicator, CI) can be introduced for this purpose.

In some embodiments, codepoints of the CI field corresponds to indices in a CB of co-phasing matrices. Each matrix has entries (also called co-phasing factors) belonging to a K-PSK modulation alphabet, where K is the constellation size. Specifically, for $N_g$ AGs co-phased with K-PSK symbols, there will be $K^{(N_g-1)}$ co-phasing vectors per transmission layer. Hence, the number of CI bits needed to signal the co-phasing vector is $\lceil \log_2(K^{(N_g-1)}) \rceil$ for single-layer transmission.

For example, with single-layer transmission and K=4 (4-PSK symbols), $N_g$=2 AGs can be co-phased in four different ways, corresponding to co-phasing vectors {[1,1], [1,j], [1,−1], [1,−j]}. In this case, a CI field of two bits representing four codepoints can be used. A first CI codepoint can correspond to a first co-phasing vector, a second CI codepoint can correspond to a second co-phasing vector, etc.

As another example, for K=8, $N_g$=2 AGs can be co-phased in eight different ways, corresponding to co-phasing vectors {[1:1], [1, (1+j)/2], [1,j], [1, (−1+j)/2], [1,−1], [1, (−1−j)/2], [1, −j]. [1, (1−j)/2]}. In this example, a CI field of 3 bits representing four codepoints can be used.

In some embodiments, the RAN node can configure the constellation size, K, that the UE should use for the co-phasing factor. This can be done via RRC (e.g., in FIG. 8 operation 820) or dynamically via DCI signaling. In some embodiments, the UE can indicate (e.g., in FIG. 8 operation 810) supported co-phasing constellation size(s) and the RAN node can select the constellation size to be configured from the supported constellation sizes.

In other embodiments, when the UE's antennas can be grouped in various ways given by $N_g \in \{2,4,8\}$, the co-phasing vectors for $N_g$ correspond to vectors in NR Rel-15 UL codebooks for single-layer transmission, according to the following:

$N_g$=2: fully-coherent (FC) part (i.e., indices 2-5) of the 2-Tx codebook in 3GPP TS 38.211 Table 6.3.1.5-2 can be used to co-phase the two AGs, such that two bits can be used to indicate which of four possible indices (and corresponding vector) should be used.

$N_g$=4: FC part (i.e., indices 12-27) of the 4-Tx codebook in 3GPP TS 38.211 Table 6.3.1.5-3 can be used to co-phase the four AGs, such that four bits can be used to indicate which of 16 possible indices (and corresponding vector) should be used.

$N_g$=8: co-phasing factors can be generated by $C_2 \otimes C_4$, where $C_2$ and $C_4$ are the FC parts of the 2-Tx and 4-Tx codebooks mentioned above, respectively. In this case, six bits can be used to indicate which of the 4×16=64 possible indices (and corresponding vectors) should be used.

In other embodiments, a Discrete Fourier Transform (DFT) matrix of size $N_g$ can be used to generate the possible co-phase vectors. For example, when the UE's antennas can be grouped in various ways given by $N_g$={2,3,4,5,6,7,8}, {1,2,2,3,3,3,3} bits are required to signal the particular co-phase vector out of the corresponding possible $N_g$ vectors. Thus, for the specific case of $N_g$=4, two bits are required to signal the co-phase vector.

In some embodiments, when the RAN node explicitly indicates to the UE a subset of $N_a$ active AGs in $$C_{N_a}^{N_g}$$

ways with an additional $$\left\lceil \log_2\left(C_{N_a}^{N_g}\right) \right\rceil$$

bits, the RAN node can signal the co-phase vector between the active AGs in any of the ways described above. For example, when the UE reports $N_g$=4 and the RAN node selects $N_a$=2 active AGs, three bits are required to indicate the specific two active AGs of the four total AGs. Alternatively, the active subset of groups can be implicitly signaled through SRI, e.g., based on a correspondence between active AGs and SRI codepoints.

Various features of the embodiments described above correspond to various operations illustrated in FIGS. 10-11, which show exemplary methods (e.g., procedures) for a UE and a RAN node, respectively. In other words, various features of the operations described below correspond to various embodiments described above. Furthermore, the exemplary methods shown in FIGS. 10-11 can be used cooperatively to provide various benefits, advantages, and/or solutions to problems described herein. Although FIGS. 10-11 show specific blocks in particular orders, the operations of the exemplary methods can be performed in different orders than shown and can be combined and/or divided into blocks having different functionality than shown. Optional blocks or operations are indicated by dashed lines.

In particular, FIG. 10 shows an exemplary method (e.g., procedure) for a UE configured for UL transmission to a RAN using a plurality of AGs, each AG comprising a plurality of antenna elements, according to some embodiments. The exemplary method can be performed by a UE (e.g., wireless device, IoT device, etc.) such as described elsewhere herein.

The exemplary method can include one or more of the following operations, each denoted by a corresponding block number in FIG. 10:

(910) transmitting, to a RAN node, AG information pertaining to the plurality of AGs;

(920) receiving an SRS configuration from the RAN node, wherein the SRS configuration indicates SRS resources and/or SRS resource sets for each of the AGs:

(930) transmitting SRS using the plurality of AGs, in accordance with the SRS configuration:

(940) receiving, from the RAN node, an UL transmission configuration including of one or more of the following:

- for each AG, an associated TPMI,
- for each AG, an associated SRI and/or an associated SRSI,
- one or more LPIs corresponding to one or more of the TPMIs, and
- one or more co-phasing indicators (CIs) that indicate phase shifts to be applied to corresponding one or more of the AGs for coherent transmission; and (960) transmitting a plurality of layers of data to the RAN node (e.g., on PUSCH) using the plurality of AGs, in accordance with the UL transmission configuration.

While each of these operations is shown as optional in FIG. 10 based on dashed lines, it should be understood that at least one of them is performed.

In some embodiments, the AG information includes indication of one or more of the following: number of AGs, number of antenna elements per AG, and co-phasing capability among the plurality of AGs. In some of these embodiments, the AG information indicates a first plurality of different co-phasing capabilities, and each CI (e.g., in the UL configuration) is contained in a corresponding UL configuration bitfield with a size that is proportional to the first plurality. In some of these embodiments, the indicated co-phasing capability is one or more of the following:

- no support for co-phasing between multiple AGs:
- support for cyclic delay diversity (CDD) co-phasing between multiple AGs:
- support for coherent co-phasing between multiple AGs; and
- one or more supported co-phasing phase granularities.

In some embodiments, when the indicated co-phasing capability is no support for co-phasing between multiple AGs, the one or more CIs are omitted from the UL transmission configuration. In some embodiments, the indicated co-phasing capability also includes an indication of whether layer permutation is supported when co-phasing layers are over multiple AGs.

In some embodiments, the one or more LPIs correspond to the respective one or more CIs, with each LPI and corresponding CI being jointly encoded in a separate bitfield of the UL transmission configuration. In some embodiments, the UL configuration includes the SRIs and/or SRSIs associated with the plurality of AGs but excludes the TPMIs associated with the plurality of AGs, with the TPMI associated with each AG being implied by the SRI and/or SRSI associated with the same AG.

In some embodiments, each SRI and/or SRSI associated with an AG indicates whether the AG should be used for transmitting the plurality of layers of data to the RAN node. The exemplary method also includes the operations of block 950, where the UE can ignore any bitfields in the UL configuration that correspond to AGs indicated as not used by SRIs and/or SRSIs.

In some embodiments, each LPI indicates one or more of the following:

- a particular layer transmitted on a first one of the AGs that should be co-phased with a particular layer transmitted on a second one of the AGs; and
- a mapping between a plurality of layers transmitted on a particular one of the AGs and a corresponding plurality of precoding vectors indicated by the TPMI associated with the particular AG.

In some embodiments, the UL configuration also includes an indication of a number of antenna ports to be used for transmitting DMRS associated with the plurality of layers. In such case, the indicated number of antenna ports also indicates whether the plurality of AGs should be co-phased while transmitting the plurality of layers of data.

In some embodiments, each layer of data is associated with a corresponding one or more of the following in the received UL configuration: SRI, SRSI, and TPMI. In some variants, the indicated number of antenna ports being equal to the number of layers of data indicates that the plurality of AGs should not be co-phased while transmitting the plurality of layers of data. In other variants, the number of layers of data being equal to an integer multiple (M) of the indicated number of antenna ports indicates that M of the AGs should be co-phased while transmitting the plurality of layers of data.

In some embodiments, each CI (e.g., in the UL configuration) is based on the AG information (e.g., sent in block 910) and indicates one of the following for an associated at least two AGs:

- no co-phasing to be used for the at least two AGs:
- cyclic delay diversity (CDD) to be used for the at least two AGs; and
- coherent co-phasing to be used for the at least two AGs, together with one or more phase shifts to be applied.

In some embodiments, the one or more phase shifts include a plurality of phase shifts to be applied to the respective plurality of layers. In some embodiments, each CI includes an index to an entry in a set or table of one of the following:

- co-phasing vectors applicable for transmission of a single layer of data using the plurality of AGs:
- co-phasing vectors derived from a plurality of other sets or tables of co-phasing vectors applicable for transmission of a single layer of data using the plurality of AGs; or
- DFT vectors.

In some embodiments, each TPMI (e.g., in the UL configuration) includes an index to an entry in a precoder vector codebook corresponding to a number of antenna ports used for transmitting DMRS associated with the plurality of layers, wherein the number of antenna ports is equal to the plurality (i.e., number) of antenna elements per AG.

Figure 12:
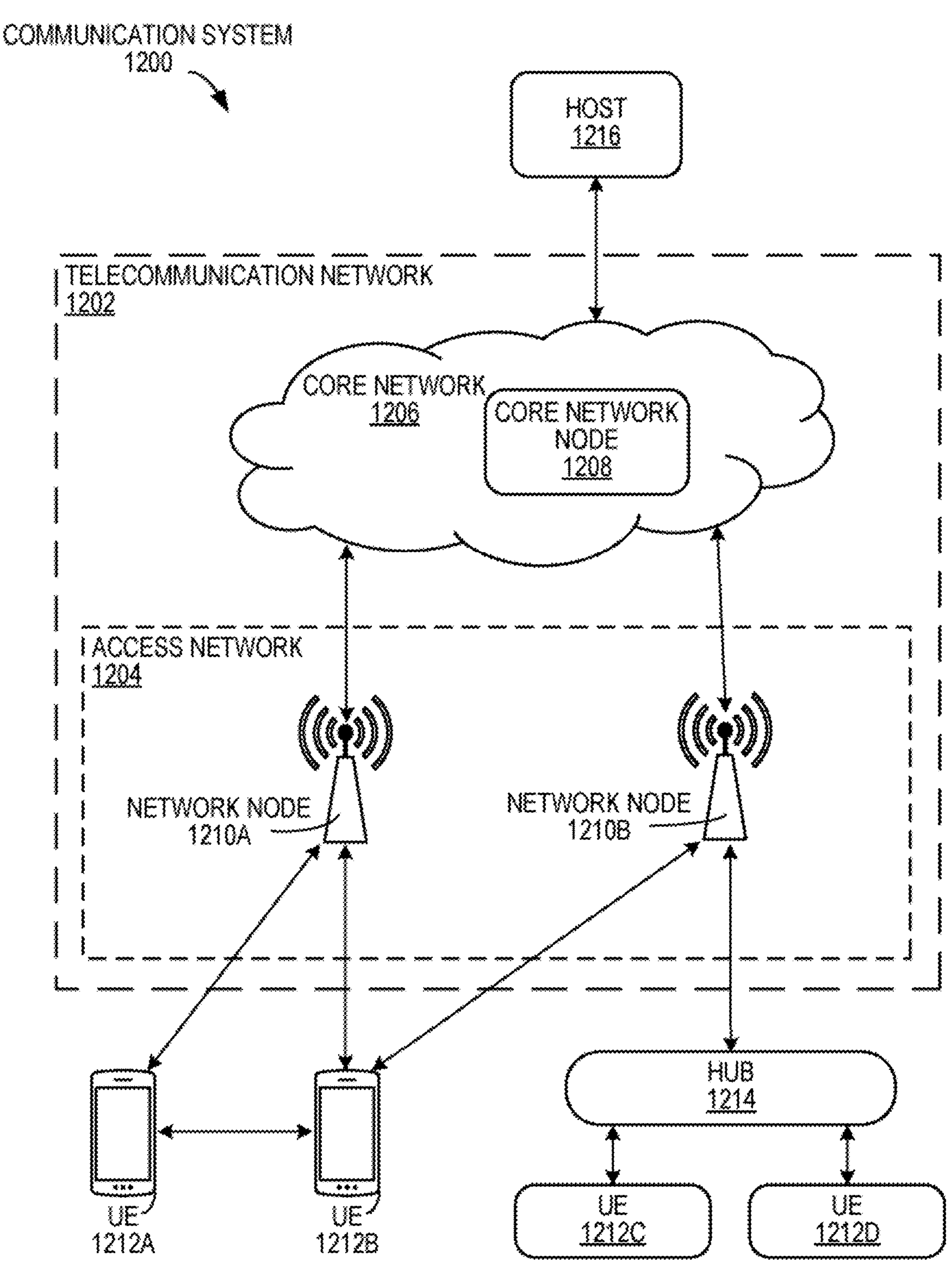
FIG. 12 shows an example of a communication system, according to an embodiment.

In addition, FIG. 12 shows an exemplary method (e.g., procedure) for a RAN node configured to receive UL transmissions from a UE having a plurality of AGs, each AG comprising a plurality of antenna elements, according to various embodiments. The exemplary method can be performed by a RAN node (e.g., base station, eNB, gNB, ng-eNB, etc., or component thereof) such as described elsewhere herein.

The exemplary method can include one or more of the following operations, each denoted by a corresponding block number in FIG. 11:

(1010) receiving, from the UE, AG information pertaining to the plurality of AGs:

(1020) sending an SRS configuration to the UE, wherein the SRS configuration indicates SRS resources and/or SRS resource sets for each of the AGs:

(1030) receiving SRS transmitted by the UE using the plurality of AGs, in accordance with the SRS configuration:

(1040) based on the AG information and the received SRS, determining an UL transmission configuration for the UE, including of one or more of the following:
- for each AG, an associated TPMI,
- for each AG, an associated SRI and/or an associated SRSI,
- one or more LPIs corresponding to one or more of the TPMIs, and
- one or more CIs that indicate phase shifts to be applied to corresponding one or more of the AGs for coherent transmission:

(1050) sending the UL configuration to the UE; and (1060) receiving a plurality of layers of data transmitted by the UE (e.g., on PUSCH) using the plurality of AGs in accordance with the UL transmission configuration.

While each of these operations is shown as optional in FIG. 12 based on dashed lines, it should be understood that at least one of them is performed.

In some embodiments, the AG information includes indication of one or more of the following: number of AGs, number of antenna elements per AG, and co-phasing capability among the plurality of AGs. In some of these embodiments, the AG information indicates a first plurality of different co-phasing capabilities, and each CI (e.g., in the UL configuration) is contained in a corresponding UL configuration bitfield with a size that is proportional to the first plurality. In some of these embodiments, the indicated co-phasing capability is one or more of the following:
- no support for co-phasing between multiple AGs:
- support for CDD co-phasing between multiple AGs:
- support for coherent co-phasing between multiple AGs; and
- one or more supported co-phasing phase granularities.

In some embodiments, when the indicated co-phasing capability is no support for co-phasing between multiple AGs, the one or more CIs are omitted from the UL transmission configuration. In some of these embodiments, the indicated co-phasing capability also includes an indication of whether layer permutation is supported when co-phasing layers over multiple AGs.

In some embodiments, the one or more LPIs correspond to the respective one or more CIs, with each LPI and corresponding CI being jointly encoded in a separate bitfield of the UL transmission configuration. In some embodiments, the UL configuration includes the SRIs and/or SRSIs associated with the plurality of AGs but excludes the TPMIs associated with the plurality of AGs, with the TPMI associated with each AG being implied by the SRI and/or SRSI associated with the same AG.

In some embodiments, each SRI and/or SRSI associated with an AG indicates whether the AG should be used for transmitting the plurality of layers of data to the RAN node. In some embodiments, each LPI indicates one or more of the following:
- a particular layer transmitted on a first one of the AGs that should be co-phased with a particular layer transmitted on a second one of the AGs; and
- a mapping between a plurality of layers transmitted on a particular one of the AGs and a corresponding plurality of precoding vectors indicated by the TPMI associated with the particular AG.

In some embodiments, the UL configuration also includes an indication of a number of antenna ports to be used for transmitting DMRS associated with the plurality of layers. In such case, the indicated number of antenna ports also indicates whether the plurality of AGs should be co-phased while transmitting the plurality of layers of data.

In some embodiments, each layer of data is associated with a corresponding one or more of the following in the received UL configuration: SRI, SRSI, and TPMI. In some variants, the indicated number of antenna ports being equal to the number of layers of data indicates that the plurality of AGs should not be co-phased while transmitting the plurality of layers of data. In other variants, the number of layers of data being equal to an integer multiple (M) of the indicated number of antenna ports indicates that M of the AGs should be co-phased while transmitting the plurality of layers of data.

In some embodiments, each CI (e.g., in the UL configuration) is based on the AG information (e.g., received in block 1010) and indicates one of the following for an associated at least two AGs: no co-phasing to be used for the at least two AGs, CDD to be used for the at least two AGs; and coherent co-phasing to be used for the at least two AGs, together with one or more phase shifts to be applied.

In some embodiments, the one or more phase shifts include a plurality of phase shifts to be applied to the respective plurality of layers. In some embodiments, each CI includes an index to an entry in a set or table of one of the following: co-phasing vectors applicable for transmission of a single layer of data using the plurality of AGs; co-phasing vectors derived from a plurality of other sets or tables of co-phasing vectors applicable for transmission of a single layer of data using the plurality of AGs; or DFT vectors.

In some embodiments, each TPMI (e.g., in the UL configuration) includes an index to an entry in a precoder vector codebook corresponding to a number of antenna ports used for transmitting DMRS associated with the plurality of layers, wherein the number of antenna ports is equal to the plurality (i.e., number) of antenna elements per AG.

FIG. 12 shows an example of a communication system 1200 in accordance with some embodiments.

In the example, the communication system 1200 includes a telecommunication network 1202 that includes an access network 1204, such as a radio access network (RAN), and a core network 1206, which includes one or more core network nodes 1208. The access network 1204 includes one or more access network nodes, such as network nodes 1210*a* and 1210*b* (one or more of which may be generally referred to as network nodes 1210), or any other similar 3GPP access node or non-3GPP access point. The network nodes 1210 facilitate direct or indirect connection of UE, such as by connecting UEs 1212*a*, 1212*b*, 1212*c*, and 1212*d* (one or more of which may be generally referred to as UEs 1212) to the core network 1206 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1200 may include any number of wired or wireless networks, network nodes, UEs, and/or any other components or systems that may facilitate or participate in the communication of data and/or signals whether via wired or wireless connections. The communication system 1200 may include and/or interface with any type of communication, telecommunication, data, cellular, radio network, and/or other similar type of system.

The UEs 1212 may be any of a wide variety of communication devices, including wireless devices arranged, configured, and/or operable to communicate wirelessly with the network nodes 1210 and other communication devices. Similarly, the network nodes 1210 are arranged, capable, configured, and/or operable to communicate directly or indirectly with the UEs 1212 and/or with other network nodes or equipment in the telecommunication network 1202 to enable and/or provide network access, such as wireless network access, and/or to perform other functions, such as administration in the telecommunication network 1202.

In the depicted example, the core network 1206 connects the network nodes 1210 to one or more hosts, such as host 1216. These connections may be direct or indirect via one or more intermediary networks or devices. In other examples, network nodes may be directly coupled to hosts. The core network 1206 includes one more core network nodes (e.g., core network node 1208) that are structured with hardware and software components. Features of these components may be substantially similar to those described with respect to the UEs, network nodes, and/or hosts, such that the descriptions thereof are generally applicable to the corresponding components of the core network node 1208. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1216 may be under the ownership or control of a service provider other than an operator or provider of the access network 1204 and/or the telecommunication network 1202, and may be operated by the service provider or on behalf of the service provider. The host 1216 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1200 of FIG. 12 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); LTE, and/or other suitable 2G, 3G, 4G, 5G standards, or any applicable future generation standard (e.g., 6G): wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1202 is a cellular network that implements 3GPP standardized features. Accordingly, the telecommunications network 1202 may support network slicing to provide different logical networks to different devices that are connected to the telecommunication network 1202. For example, the telecommunications network 1202 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1212 are configured to transmit and/or receive information without direct human interaction. For instance, a UE may be designed to transmit information to the access network 1204 on a predetermined schedule, when triggered by an internal or external event, or in response to requests from the access network 1204. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1214 communicates with the access network 1204 to facilitate indirect communication between one or more UEs (e.g., UE 1212*c* and/or 1212*d*) and network nodes (e.g., network node 1210*b*). In some examples, the hub 1214 may be a controller, router, content source and analytics, or any of the other communication devices described herein regarding UEs. For example, the hub 1214 may be a broadband router enabling access to the core network 1206 for the UEs. As another example, the hub 1214 may be a controller that sends commands or instructions to one or more actuators in the UEs. Commands or instructions may be received from the UEs, network nodes 1210, or by executable code, script, process, or other instructions in the hub 1214. As another example, the hub 1214 may be a data collector that acts as temporary storage for UE data and, in some embodiments, may perform analysis or other processing of the data. As another example, the hub 1214 may be a content source. For example, for a UE that is a VR headset, display, loudspeaker or other media delivery device, the hub 1214 may retrieve VR assets, video, audio, or other media or data related to sensory information via a network node, which the hub 1214 then provides to the UE either directly, after performing local processing, and/or after adding additional local content. In still another example, the hub 1214 acts as a proxy server or orchestrator for the UEs, in particular in if one or more of the UEs are low energy IoT devices.

The hub 1214 may have a constant/persistent or intermittent connection to the network node 1210*b*. The hub 1214 may also allow for a different communication scheme and/or schedule between the hub 1214 and UEs (e.g., UE 1212*c* and/or 1212*d*), and between the hub 1214 and the core network 1206. In other examples, the hub 1214 is connected to the core network 1206 and/or one or more UEs via a wired connection. Moreover, the hub 1214 may be configured to connect to an M2M service provider over the access network 1204 and/or to another UE over a direct connection. In some scenarios, UEs may establish a wireless connection with the network nodes 1210 while still connected via the hub 1214 via a wired or wireless connection. In some embodiments, the hub 1214 may be a dedicated hub—that is, a hub whose primary function is to route communications to/from the UEs from/to the network node 1210*b*. In other embodiments, the hub 1214 may be a non-dedicated hub—that is, a device which is capable of operating to route communications between the UEs and network node 1210*b*, but which is additionally capable of operating as a communication start and/or end point for certain data channels.

Figure 13:
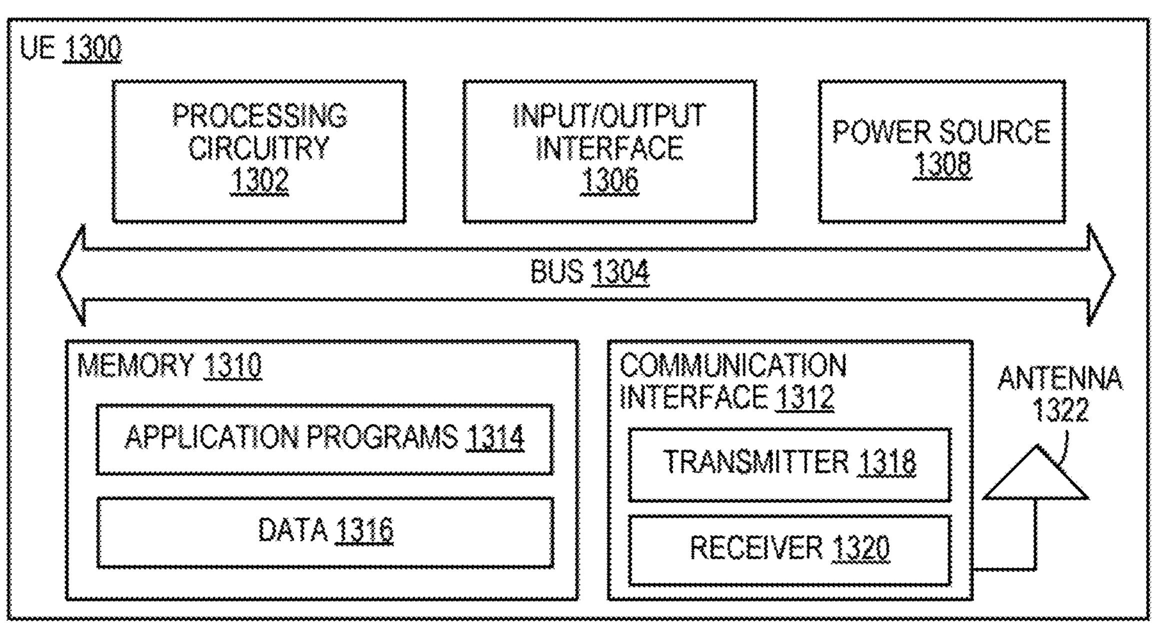
FIG. 13 shows a schematic diagram of a UE, according to an embodiment.

FIG. 13 shows a UE 1300 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3GPP, including a narrow band internet of things (NB-IoT) UE, a machine type communication (MTC) UE, and/or an enhanced MTC (cMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1300 includes processing circuitry 1302 that is operatively coupled via a bus 1304 to an input/output interface 1306, a power source 1308, a memory 1310, a communication interface 1312, and/or any other component, or any combination thereof. Certain UEs may utilize all or a subset of the components shown in FIG. 13. The level of integration between the components may vary from one UE to another UE. Further, certain UEs may contain multiple instances of a component, such as multiple processors, memories, transceivers, transmitters, receivers, etc.

The processing circuitry 1302 is configured to process instructions and data and may be configured to implement any sequential state machine operative to execute instructions stored as machine-readable computer programs in the memory 1310. The processing circuitry 1302 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1302 may include multiple central processing units (CPUs). Also, the processing circuitry 1302 can be configured to perform any of the steps of method 100 of FIG. 5.

In the example, the input/output interface 1306 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1300. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like.

In some embodiments, the power source 1308 is structured as a battery or battery pack. Other types of power sources, such as an external power source (e.g., an electricity outlet), photovoltaic device, or power cell, may be used. The power source 1308 may further include power circuitry for delivering power from the power source 1308 itself, and/or an external power source, to the various parts of the UE 1300 via input circuitry or an interface such as an electrical power cable. Delivering power may be, for example, for charging of the power source 1308. Power circuitry may perform any formatting, converting, or other modification to the power from the power source 1308 to make the power suitable for the respective components of the UE 1300 to which power is supplied.

The memory 1310 may be or be configured to include memory such as random access memory (RAM), read-only memory (ROM), programmable ROM (PROM), erasable PROM (EPROM), electrically EPROM (EEPROM), magnetic disks, optical disks, hard disks, removable cartridges, flash drives, and so forth. In one example, the memory 1310 includes one or more application programs 1314, such as an operating system, web browser application, a widget, gadget engine, or other application, and corresponding data 1316. The memory 1310 may store, for use by the UE 1300, any of a variety of various operating systems or combinations of operating systems.

The memory 1310 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as "SIM card." The memory 1310 may allow the UE 1300 to access instructions, application programs and the like, stored on transitory or non-transitory memory media, to off-load data, or to upload data. An article of manufacture, such as one utilizing a communication system may be tangibly embodied as or in the memory 1310, which may be or comprise a device-readable storage medium.

The processing circuitry 1302 may be configured to communicate with an access network or other network using the communication interface 1312. The communication interface 1312 may comprise one or more communication subsystems and may include or be communicatively coupled to an antenna 1322. The communication interface 1312 may include one or more transceivers used to communicate, such as by communicating with one or more remote transceivers of another device capable of wireless communication (e.g., another UE or a network node in an access network). Each transceiver may include a transmitter 1318 and/or a receiver 1320 appropriate to provide network communications (e.g., optical, electrical, frequency allocations, and so forth). Moreover, the transmitter 1318 and receiver 1320 may be coupled to one or more antennas (e.g., antenna 1322) and may share circuit components, software or firmware, or alternatively be implemented separately.

In the illustrated embodiment, communication functions of the communication interface 1312 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1312, via a wireless connection to a network node.

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an IoT device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, etc. A UE in the form of an IoT device comprises circuitry and/or software in dependence of the intended application of the IoT device in addition to other components as described in relation to the UE 1300 shown in FIG. 13.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 14:
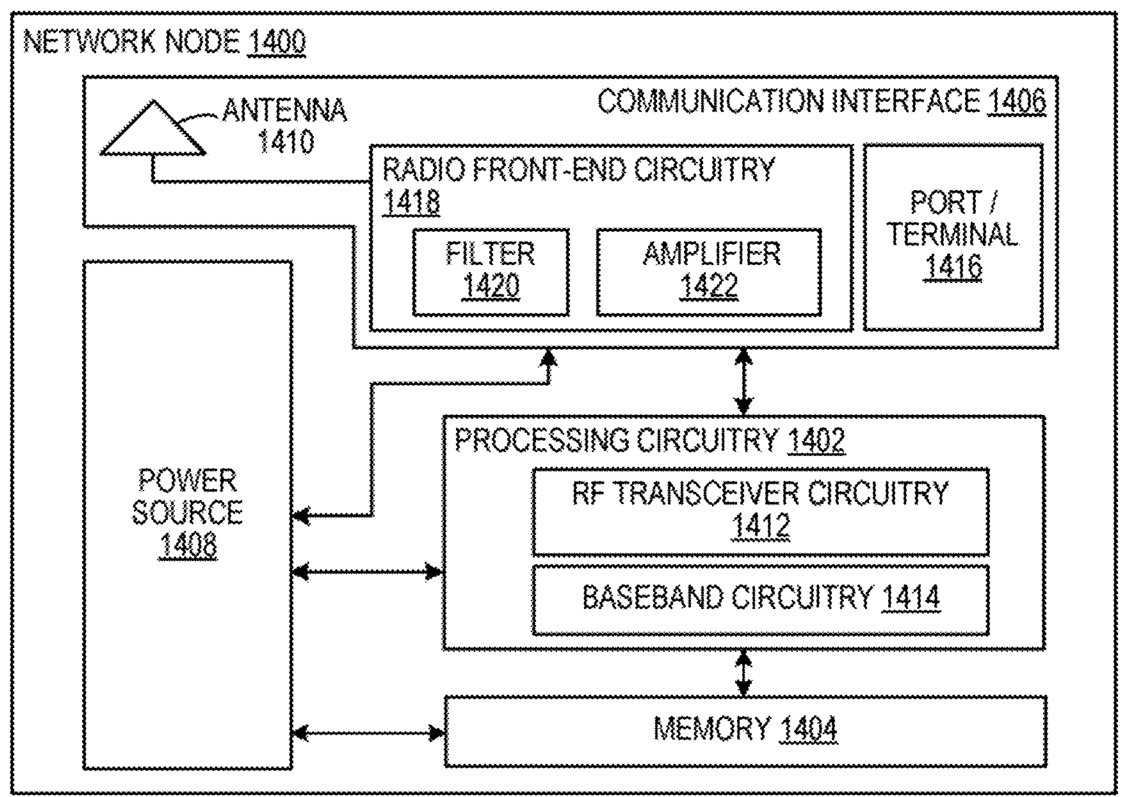
FIG. 14 shows a schematic diagram of a network node, according to an embodiment.

FIG. 14 shows a network node 1400 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved NBs (eNBs) and NR NBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1400 includes a processing circuitry 1402, a memory 1404, a communication interface 1406, and a power source 1408. The network node 1400 may be composed of multiple physically separate components (e.g., a NB component and a RNC component, or a BTS component and a BSC component, etc.), which may each have their own respective components. In certain scenarios in which the network node 1400 comprises multiple separate components (e.g., BTS and BSC components), one or more of the separate components may be shared among several network nodes. For example, a single RNC may control multiple NBs. In such a scenario, each unique NB and RNC pair, may in some instances be considered a single separate network node. In some embodiments, the network node 1400 may be configured to support multiple radio access technologies (RATs). In such embodiments, some components may be duplicated (e.g., separate memory 1404 for different RATs) and some components may be reused (e.g., a same antenna 1410 may be shared by different RATs). The network node 1400 may also include multiple sets of the various illustrated components for different wireless technologies integrated into network node 1400, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1400.

The processing circuitry 1402 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1400 components, such as the memory 1404, to provide network node 1400 functionality. For example, the processing circuitry 1402 is configured to perform any actions/operations/blocks of method 200 of FIG. 6.

In some embodiments, the processing circuitry 1402 includes a system on a chip (SOC). In some embodiments, the processing circuitry 1402 includes one or more of radio frequency (RF) transceiver circuitry 1412 and baseband processing circuitry 1414. In some embodiments, the radio frequency (RF) transceiver circuitry 1412 and the baseband processing circuitry 1414 may be on separate chips (or sets of chips), boards, or units, such as radio units and digital units. In alternative embodiments, part or all of RF transceiver circuitry 1412 and baseband processing circuitry 1414 may be on the same chip or set of chips, boards, or units.

The memory 1404 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1402. The memory 1404 may store any suitable instructions, data, or information, including a computer program, software, an application including one or more of logic, rules, code, tables, and/or other instructions capable of being executed by the processing circuitry 1402 and utilized by the network node 1400. The memory 1404 may be used to store any calculations made by the processing circuitry 1402 and/or any data received via the communication interface 1406. In some embodiments, the processing circuitry 1402 and memory 1404 is integrated.

The communication interface 1406 is used in wired or wireless communication of signaling and/or data between a network node, access network, and/or UE. As illustrated, the communication interface 1406 comprises port(s)/terminal(s) 1416 to send and receive data, for example to and from a network over a wired connection. The communication interface 1406 also includes radio front-end circuitry 1418 that may be coupled to, or in certain embodiments a part of, the antenna 1410. Radio front-end circuitry 1418 comprises filters 1420 and amplifiers 1422. The radio front-end circuitry 1418 may be connected to an antenna 1410 and processing circuitry 1402. The radio front-end circuitry may be configured to condition signals communicated between antenna 1410 and processing circuitry 1402. The radio front-end circuitry 1418 may receive digital data that is to be sent out to other network nodes or UEs via a wireless connection. The radio front-end circuitry 1418 may convert the digital data into a radio signal having the appropriate channel and bandwidth parameters using a combination of filters 1420 and/or amplifiers 1422. The radio signal may then be transmitted via the antenna 1410. Similarly, when receiving data, the antenna 1410 may collect radio signals which are then converted into digital data by the radio front-end circuitry 1418. The digital data may be passed to the processing circuitry 1402. In other embodiments, the communication interface may comprise different components and/or different combinations of components.

In certain alternative embodiments, the network node 1400 does not include separate radio front-end circuitry 1418, instead, the processing circuitry 1402 includes radio front-end circuitry and is connected to the antenna 1410. Similarly, in some embodiments, all or some of the RF transceiver circuitry 1412 is part of the communication interface 1406. In still other embodiments, the communication interface 1406 includes one or more ports or terminals 1416, the radio front-end circuitry 1418, and the RF transceiver circuitry 1412, as part of a radio unit (not shown), and the communication interface 1406 communicates with the baseband processing circuitry 1414, which is part of a digital unit (not shown).

The antenna 1410 may include one or more antennas, or antenna arrays, configured to send and/or receive wireless signals. The antenna 1410 may be coupled to the radio front-end circuitry 1418 and may be any type of antenna capable of transmitting and receiving data and/or signals wirelessly. In certain embodiments, the antenna 1410 is separate from the network node 1400 and connectable to the network node 1400 through an interface or port.

The antenna 1410, communication interface 1406, and/or the processing circuitry 1402 may be configured to perform any receiving operations and/or certain obtaining operations described herein as being performed by the network node. Any information, data and/or signals may be received from a UE, another network node and/or any other network equipment. Similarly, the antenna 1410, the communication interface 1406, and/or the processing circuitry 1402 may be configured to perform any transmitting operations described herein as being performed by the network node. Any information, data and/or signals may be transmitted to a UE, another network node and/or any other network equipment.

The power source 1408 provides power to the various components of network node 1400 in a form suitable for the respective components (e.g., at a voltage and current level needed for each respective component). The power source 1408 may further comprise, or be coupled to, power management circuitry to supply the components of the network node 1400 with power for performing the functionality described herein. For example, the network node 1400 may be connectable to an external power source (e.g., the power grid, an electricity outlet) via an input circuitry or interface such as an electrical cable, whereby the external power source supplies power to power circuitry of the power source 1408. As a further example, the power source 1408 may comprise a source of power in the form of a battery or battery pack which is connected to, or integrated in, power circuitry. The battery may provide backup power should the external power source fail.

Embodiments of the network node 1400 may include additional components beyond those shown in FIG. 14 for providing certain aspects of the network node's functionality, including any of the functionality described herein and/or any functionality necessary to support the subject matter described herein. For example, the network node 1400 may include user interface equipment to allow input of information into the network node 1400 and to allow output of information from the network node 1400. This may allow a user to perform diagnostic, maintenance, repair, and other administrative functions for the network node 1400.

Figure 15:
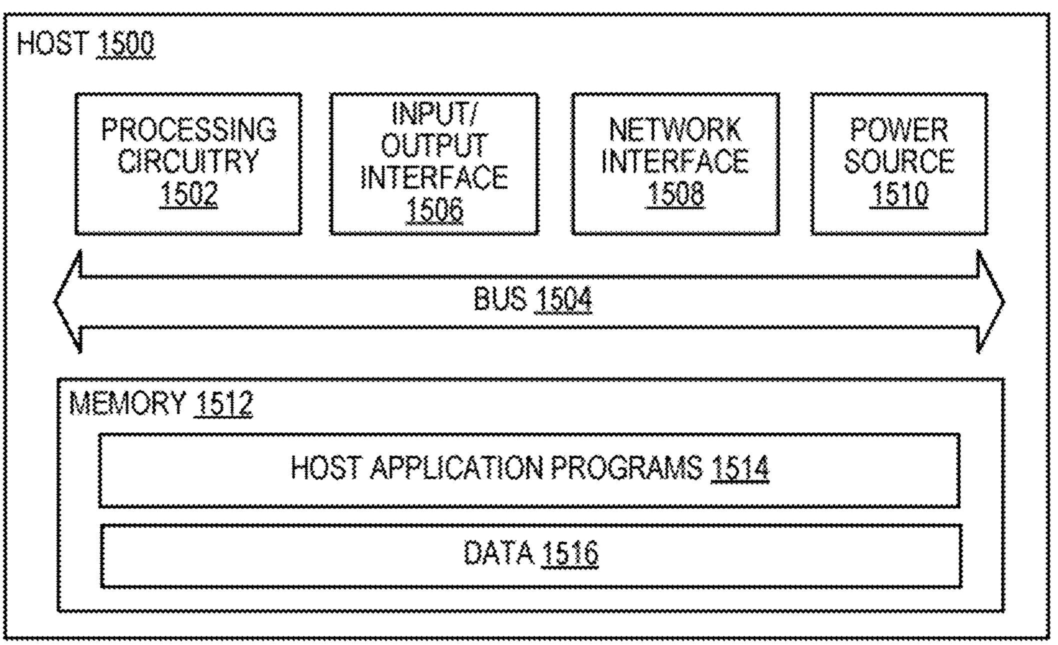
FIG. 15 illustrates a block diagram of a host.

FIG. 15 is a block diagram of a host 1500, which may be an embodiment of the host 1216 of FIG. 12, in accordance with various aspects described herein. As used herein, the host 1500 may be or comprise various combinations hardware and/or software, including a standalone server, a blade server, a cloud-implemented server, a distributed server, a virtual machine, container, or processing resources in a server farm. The host 1500 may provide one or more services to one or more UEs.

The host 1500 includes processing circuitry 1502 that is operatively coupled via a bus 1504 to an input/output interface 1506, a network interface 1508, a power source 1510, and a memory 1512. Other components may be included in other embodiments. Features of these components may be substantially similar to those described with respect to the devices of previous figures, such as FIGS. 13 and 14, such that the descriptions thereof are generally applicable to the corresponding components of host 1500.

The memory 1512 may include one or more computer programs including one or more host application programs 1514 and data 1516, which may include user data, e.g., data generated by a UE for the host 1500 or data generated by the host 1500 for a UE. Embodiments of the host 1500 may utilize only a subset or all of the components shown. The host application programs 1514 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1514 may also provide for user authentication and licensing checks and may periodically report health, routes, and content availability to a central node, such as a device in or on the edge of a core network. Accordingly, the host 1500 may select and/or indicate a different host for over-the-top services for a UE. The host application programs 1514 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 16:
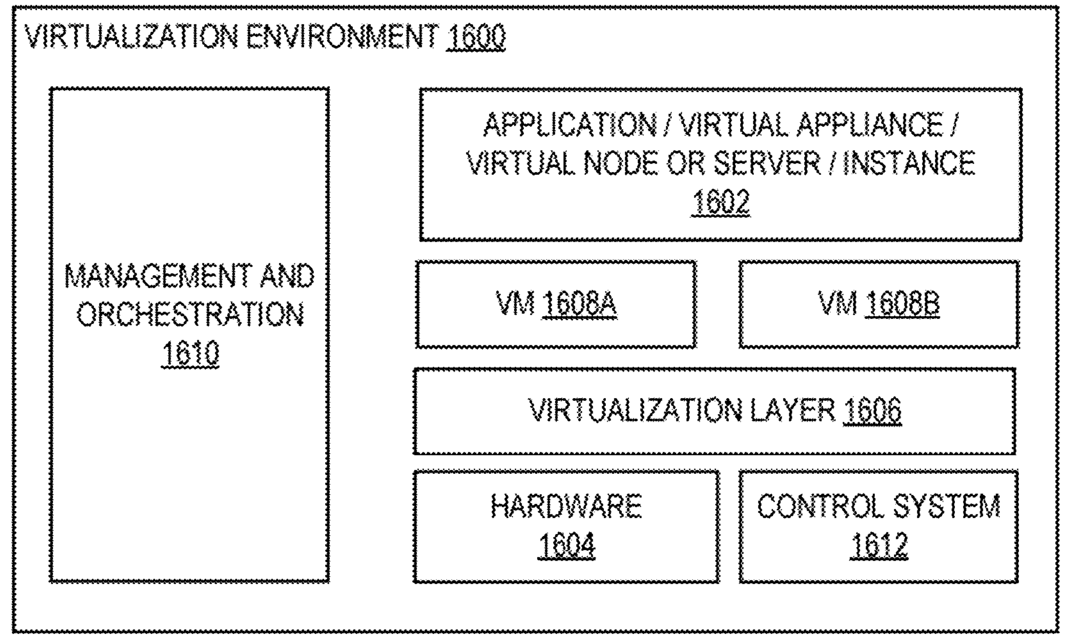
FIG. 16 illustrates a block diagram illustrating a virtualization environment.

FIG. 16 is a block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1600 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1602 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1604 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1606 (also referred to as hypervisors or virtual machine monitors (VMMs)), provide VMs 1608*a* and 1608*b* (one or more of which may be generally referred to as VMs 1608), and/or perform any of the functions, features and/or benefits described in relation with some embodiments described herein. The virtualization layer 1606 may present a virtual operating platform that appears like networking hardware to the VMs 1608.

The VMs 1608 comprise virtual processing, virtual memory, virtual networking or interface and virtual storage, and may be run by a corresponding virtualization layer 1606. Different embodiments of the instance of a virtual appliance 1602 may be implemented on one or more of VMs 1608, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1608 may be a software implementation of a physical machine that runs programs as if they were executing on a physical, non-virtualized machine. Each of the VMs 1608, and that part of hardware 1604 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1608 on top of the hardware 1604 and corresponds to the application 1602.

Hardware 1604 may be implemented in a standalone network node with generic or specific components. Hardware 1604 may implement some functions via virtualization. Alternatively, hardware 1604 may be part of a larger cluster of hardware (e.g. such as in a data center or CPE) where many hardware nodes work together and are managed via management and orchestration 1610, which, among others, oversees lifecycle management of applications 1602. In some embodiments, hardware 1604 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1612 which may alternatively be used for communication between hardware nodes and radio units.

Figure 17:
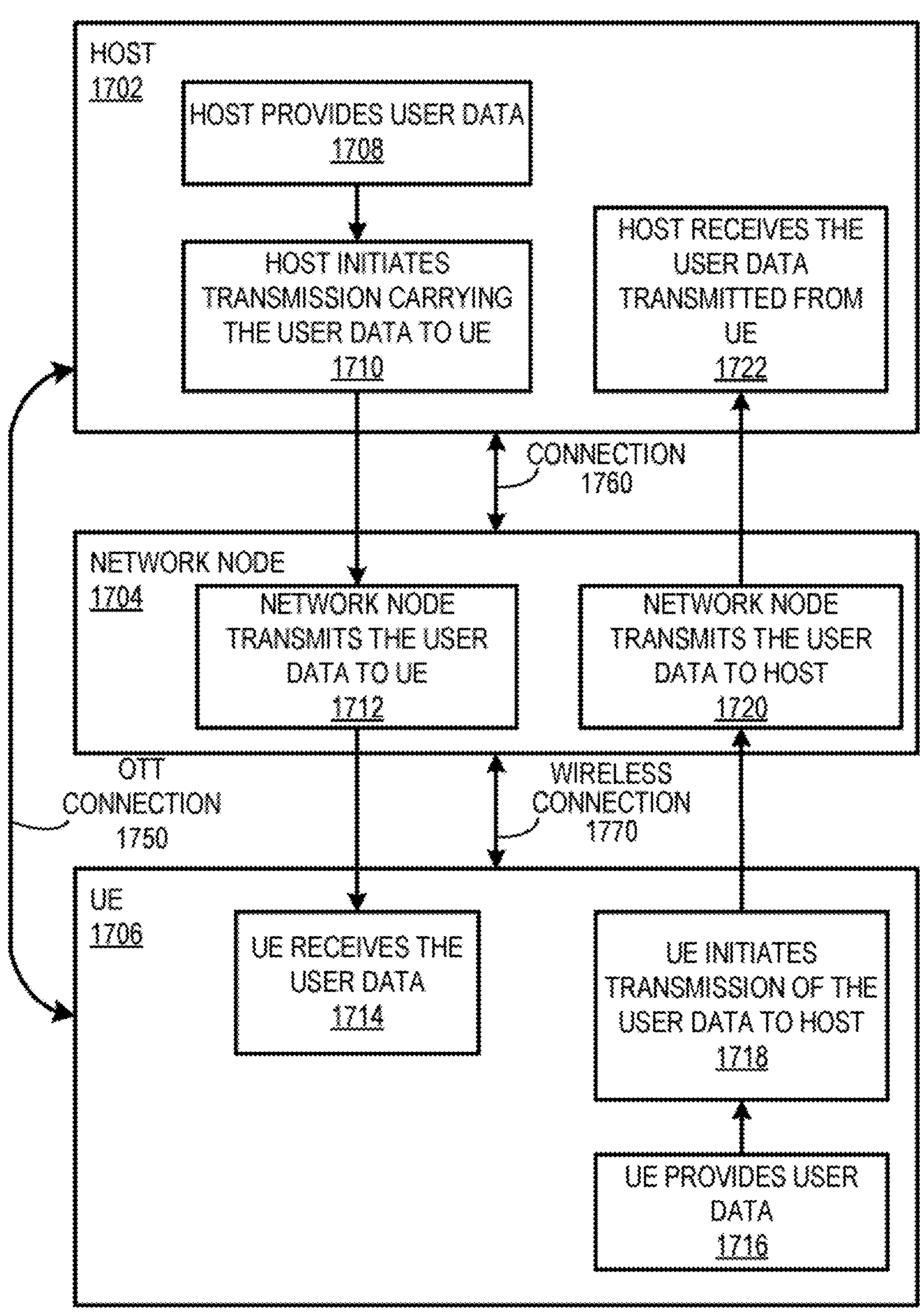
FIG. 17 shows a communication diagram of a host.

FIG. 17 shows a communication diagram of a host 1702 communicating via a network node 1704 with a UE 1706 over a partially wireless connection in accordance with some embodiments. Example implementations, in accordance with various embodiments, of the UE (such as a UE 1212*a* of FIG. 12 and/or UE 1300 of FIG. 13), network node (such as network node 1210*a* of FIG. 12 and/or network node 1400 of FIG. 14), and host (such as host 1216 of FIG. 12 and/or host 1500 of FIG. 15) discussed in the preceding paragraphs will now be described with reference to FIG. 17.

Like host 1500, embodiments of host 1702 include hardware, such as a communication interface, processing circuitry, and memory. The host 1702 also includes software, which is stored in or accessible by the host 1702 and executable by the processing circuitry. The software includes a host application that may be operable to provide a service to a remote user, such as the UE 1706 connecting via an over-the-top (OTT) connection 1750 extending between the UE 1706 and host 1702. In providing the service to the remote user, a host application may provide user data which is transmitted using the OTT connection 1750.

The network node 1704 includes hardware enabling it to communicate with the host 1702 and UE 1706. The connection 1760 may be direct or pass through a core network (like core network 1206 of FIG. 12) and/or one or more other intermediate networks, such as one or more public, private, or hosted networks. For example, an intermediate network may be a backbone network or the Internet.

The UE 1706 includes hardware and software, which is stored in or accessible by UE 1706 and executable by the UE's processing circuitry. The software includes a client application, such as a web browser or operator-specific "app" that may be operable to provide a service to a human or non-human user via UE 1706 with the support of the host 1702. In the host 1702, an executing host application may communicate with the executing client application via the OTT connection 1750 terminating at the UE 1706 and host 1702. In providing the service to the user, the UE's client application may receive request data from the host's host application and provide user data in response to the request data. The OTT connection 1750 may transfer both the request data and the user data. The UE's client application may interact with the user to generate the user data that it provides to the host application through the OTT connection 1750.

The OTT connection 1750 may extend via a connection 1760 between the host 1702 and the network node 1704 and via a wireless connection 1770 between the network node 1704 and the UE 1706 to provide the connection between the host 1702 and the UE 1706. The connection 1760 and wireless connection 1770, over which the OTT connection 1750 may be provided, have been drawn abstractly to illustrate the communication between the host 1702 and the UE 1706 via the network node 1704, without explicit reference to any intermediary devices and the precise routing of messages via these devices.

As an example of transmitting data via the OTT connection 1750, in step 1708, the host 1702 provides user data, which may be performed by executing a host application. In some embodiments, the user data is associated with a particular human user interacting with the UE 1706. In other embodiments, the user data is associated with a UE 1706 that shares data with the host 1702 without explicit human interaction. In step 1710, the host 1702 initiates a transmission carrying the user data towards the UE 1706. The host 1702 may initiate the transmission responsive to a request transmitted by the UE 1706. The request may be caused by human interaction with the UE 1706 or by operation of the client application executing on the UE 1706. The transmission may pass via the network node 1704, in accordance with the teachings of the embodiments described throughout this disclosure. Accordingly, in step 1712, the network node 1704 transmits to the UE 1706 the user data that was carried in the transmission that the host 1702 initiated, in accordance with the teachings of the embodiments described throughout this disclosure. In step 1714, the UE 1706 receives the user data carried in the transmission, which may be performed by a client application executed on the UE 1706 associated with the host application executed by the host 1702.

In some examples, the UE 1706 executes a client application which provides user data to the host 1702. The user data may be provided in reaction or response to the data received from the host 1702. Accordingly, in step 1716, the UE 1706 may provide user data, which may be performed by executing the client application. In providing the user data, the client application may further consider user input received from the user via an input/output interface of the UE 1706. Regardless of the specific manner in which the user data was provided, the UE 1706 initiates, in step 1718, transmission of the user data towards the host 1702 via the network node 1704. In step 1720, in accordance with the teachings of the embodiments described throughout this disclosure, the network node 1704 receives user data from the UE 1706 and initiates transmission of the received user data towards the host 1702. In step 1722, the host 1702 receives the user data carried in the transmission initiated by the UE 1706.

One or more of the various embodiments improve the performance of OTT services provided to the UE 1706 using the OTT connection 1750, in which the wireless connection 1770 forms the last segment. More precisely, the teachings of these embodiments may improve, e.g., the data rate, latency, power consumption and thereby provide benefits such as, e.g., reduced user waiting time, relaxed restriction on file size, improved content resolution, better responsiveness, extended battery lifetime.

In an example scenario, factory status information may be collected and analyzed by the host 1702. As another example, the host 1702 may process audio and video data which may have been retrieved from a UE for use in creating maps. As another example, the host 1702 may collect and analyze real-time data to assist in controlling vehicle congestion (e.g., controlling traffic lights). As another example, the host 1702 may store surveillance video uploaded by a UE. As another example, the host 1702 may store or control access to media content such as video, audio, VR or AR which it can broadcast, multicast or unicast to UEs. As other examples, the host 1702 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1750 between the host 1702 and UE 1706, in response to variations in the measurement results. The measurement procedure and/or the network functionality for reconfiguring the OTT connection may be implemented in software and hardware of the host 1702 and/or UE 1706. In some embodiments, sensors (not shown) may be deployed in or in association with other devices through which the OTT connection 1750 passes: the sensors may participate in the measurement procedure by supplying values of the monitored quantities exemplified above, or supplying values of other physical quantities from which software may compute or estimate the monitored quantities. The reconfiguring of the OTT connection 1750 may include message format, retransmission settings, preferred routing etc.: the reconfiguring need not directly alter the operation of the network node 1704. Such procedures and functionalities may be known and practiced in the art. In certain embodiments, measurements may involve proprietary UE signaling that facilitates measurements of throughput, propagation times, latency and the like, by the host 1702. The measurements may be implemented in that software causes messages to be transmitted, in particular empty or 'dummy' messages, using the OTT connection 1750 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The above-described embodiments are intended to be examples only. Alterations, modifications and variations may be effected to the particular embodiments by those of skill in the art without departing from the scope of the description, which is defined solely by the appended claims.

What is claimed is:

1. A method performed by a User Equipment (UE) configured with a number of transmit antenna ports ($N_{TX}$), the method comprising:

transmitting an indication of a number of transmit antenna port groups to a network node, wherein each transmit antenna port group comprises one or more of the configured transmit antenna ports and wherein the number of transmit antenna port groups is 8, which indicates that the UE is non-coherent, when $N_{TX}$ is 8; and receiving an indication of a configuration for transmitting data to the network node, the configuration based on the number of transmit antenna port groups, wherein the method further comprises associating a group of sounding reference signal (SRS) ports to a transmit antenna port group, based on an ordering of a SRS port within an SRS resource set, the ordering of the SRS port being based on a SRS port number.

2. The method of claim 1, wherein the indication of the configuration comprises an indication of a precoder for the UE to use.

3. The method of claim 1, wherein transmitting a number of transmit antenna port groups comprises transmitting an indication of a plurality of groups of transmit antenna ports.

4. The method of claim 1, wherein transmitting the indication of the number of transmit antenna port groups comprises sending a UE capability signaling comprising the indication.

5. The method of claim 1, wherein Ng is the number of transmit antenna port groups and wherein the number of transmit antenna ports in each group is given by $N_{TX}/N_g$.

6. The method of claim 1, wherein the ordering of the SRS ports is based on the SRS resource ID of the SRS resources in the SRS resource set.

7. The method of claim 1, wherein transmitting an indication of a number of transmit antenna port groups comprises transmitting an indication of coherency capability.

8. The method of claim 1, further comprising sending information related to the number of transmit antenna port groups, wherein the information comprises an indication of co-phasing capabilities between the transmit antenna port groups.

9. The method of claim 1, further comprising receiving a layer permutation indication from the network node.

10. A method performed by a network node, the method comprising:

receiving an indication of a number of transmit antenna port groups from a User Equipment (UE) configured with a number of transmit antenna ports ($N_{TX}$), wherein the number of transmit antenna port groups is 8, which indicates that the UB is non-coherent, when $N_{TX}$ is 8 and wherein a group of sounding reference signal (SRS) ports are associated with a transmit antenna port group, based on an ordering of a SRS port within an SRS resource set, the ordering of the SRS port being based on a SRS port number; and determining a configuration for the UE to transmit data, the configuration determined based on the indication of the number of transmit antenna port groups; and transmitting an indication of the determined configuration to the UE.

11. The method of claim 10, wherein receiving the indication of the number of transmit antenna port groups comprises receiving a UE capability signaling comprising the indication.

12. The method of claim 10, wherein $N_g$ is the number of transmit antenna port groups and wherein the number of transmit antenna ports in each group is given by $N_{TX}/N_g$.

13. The method of claim 10, wherein receiving an indication of a number of transmit antenna port groups comprises receiving an indication of coherency capability.

14. A User Equipment (UE) comprising processing circuitry and a network interface connected thereto, the processing circuitry configured to:

transmit an indication of a number of transmit antenna port groups to a network node, wherein each transmit antenna port group comprises one or more of the configured transmit antenna ports, wherein the number of transmit antenna port groups is 8, which indicates that the UE is non-coherent, when $N_{TX}$ is 8; and receive an indication of a configuration for transmitting data to the network node, the configuration based on the number of transmit antenna port groups, wherein the method further comprises associating a group of sounding reference signal (SRS) ports to a transmit antenna port group, based on an ordering of a SRS port within an SRS resource set, the ordering of the SRS port being based on a SRS port number.

* * * * *